(12) United States Patent
Murata

(10) Patent No.: US 7,120,613 B2
(45) Date of Patent: Oct. 10, 2006

(54) SOLUTION DATA EDIT PROCESSING APPARATUS AND METHOD, AND AUTOMATIC SUMMARIZATION PROCESSING APPARATUS AND METHOD

(75) Inventor: Masaki Murata, Tokyo (JP)

(73) Assignee: National Institute of Information and Communications Technology, Koganei (JP)

( * ) Notice: Subject to any disclaimer, the term of this patent is extended or adjusted under 35 U.S.C. 154(b) by 513 days.

(21) Appl. No.: 10/369,588

(22) Filed: Feb. 21, 2003

(65) Prior Publication Data

US 2003/0163790 A1 Aug. 28, 2003

(30) Foreign Application Priority Data

Feb. 22, 2002 (JP) ............................. 2002-045925

(51) Int. Cl.
 *G06F 15/18* (2006.01)
(52) U.S. Cl. ..................... 706/12; 706/11; 706/14; 706/50; 704/1; 704/9
(58) Field of Classification Search ............ 706/11–21, 706/45–48, 50, 51, 53, 54, 61, 934; 704/1, 704/3, 7, 9; 707/1, 7
 See application file for complete search history.

(56) References Cited

U.S. PATENT DOCUMENTS

| | | | | |
|---|---|---|---|---|
| 5,077,668 | A | * | 12/1991 | Doi ............................ 715/531 |
| 5,638,543 | A | * | 6/1997 | Pedersen et al. ............... 704/1 |
| 5,778,397 | A | * | 7/1998 | Kupiec et al. ............... 715/500 |
| 6,317,708 | B1 | * | 11/2001 | Witbrock et al. ............ 704/9 |
| 6,338,034 | B1 | * | 1/2002 | Ishikawa et al. ............. 704/9 |
| 6,537,325 | B1 | * | 3/2003 | Nishizawa ................. 715/530 |

FOREIGN PATENT DOCUMENTS

| | | |
|---|---|---|
| JP | 02-056054 | 2/1990 |
| JP | 02-297134 | 12/1990 |
| JP | 07-244663 | 9/1995 |
| JP | 10-207891 | 8/1998 |
| JP | 2001-344260 | 12/2001 |

OTHER PUBLICATIONS

Yamahiko Ito et al., "Extraction of Important Sentences From Lecture Sentences", The Association for Natural Language Processing, Proceedings of The Seventh Annual Meeting, pp. 305-308, Published: Mar. 27, 2001.

(Continued)

*Primary Examiner*—David Vincent
*Assistant Examiner*—Omar F. Fernández

(57) ABSTRACT

The present invention achieves edit processing which enables a user to freely edit solution data that becomes supervised data when processing automatic summarization using machine learning, and achieves summarization processing specialized for the user using the solution data. A user's evaluation of the summary produced by automatic processing of a text is created, and case data using the text and the summary as a problem and the input evaluation as a solution is stored. A solution and feature-set pair is extracted from the stored cases, and learning result of what solution is apt to be produced at what feature is stored. Thereafter a summary-candidate is generated from the processing target text, a feature-set is extracted from the text and summary-candidate, a summary-candidate and estimated-solution pair is generated by estimating a feature-set referring to the stored learning result, and the summary-candidate pair is used as a summary.

34 Claims, 20 Drawing Sheets

OTHER PUBLICATIONS

Tsutomu Hirao et al., Support Vector Machine, "Sentence Extraction Based on Support Vector Machines, Research Papers", 2001-FI-63, Information Proceedings Society of Japan, pp. 121-127, Published: Jul. 24, 2001.

Masaki Murata et al., Experiments on Word Sense Disambiguation Using Several Machine-Learning Methods, Society for Language Analysis in Electronic Information Communication Studies and Communications, NCL2001-2, pp. 7-14, Published: May 4, 2001.

Nello Cristianini et al., An Introduction to Support Vector Machines and Other Kernel-based Learning Methods, Cambridge University Press, Published: 2000.

Taku Kudoh, "TinySVM: Support Vector Machines", Disclosed: 2000.

* cited by examiner

In a natural language, verbs are sometimes omitted. Restoring omitted verbs is indispensable for achieving interactive systems and high quality machine translation systems. Therefore, in this research, the omitted verbs are supplemented from surface expressions (key words) and examples. When creating a rule for analysis, a text is classified on the basis of whether the text includes verbs which supplement the omitted verbs. When an experiment is carried out with targeting novels, an analysis was made on the test samples with the precision having a reproduction ratio of 84% and a relevance ratio of 82%. This shows that the method is valid. If the text includes verbs for supplementing, the precision is very high. As compared with this, if the text does not include verbs to supplement, the precision is not so high. However, when considering the difficulties of the problem in the case that the text does not include verbs to supplement, it is worthwhile if only a little analysis is possible. Also, when the corpus becomes large, the performance of computers increases, and a large-scale corpus becomes available, a method using examples proposed by this paper will become important.

FIG.3

When an experiment is carried out with targeting novels, an analysis was made on test samples with the precision having a reproduction ratio of 84% and a relevance ratio of 82%. ~r1

FIG.4A

In a natural language, verbs are sometimes omitted. Restoring omitted verbs is indispensable for achieving interactive systems and high quality machine translation systems. Therefore, in this research, the omitted verbs are supplemented from surface expressions (key words) and examples. ~r2

FIG.4B

In a natural language, verbs are sometimes omitted. Restoring omitted verbs is indispensable for achieving interactive systems and high quality machine translation systems. Therefore, in this research, the omitted verbs are supplemented from surface expressions (key words) and examples. When creating a rule for analysis, a text is classified on the basis of whether the text includes verbs which supplement the omitted verbs. When an experiment is carried out with targeting novels, an analysis was made on test samples with the precision having a reproduction ratio of 84% and a relevance ratio of 82%. ~r3

FIG.4C

In a natural language, verbs are sometimes omitted. Restoring omitted verbs is indispensable for achieving interactive systems and high quality machine translation systems. Therefore, in this research, the omitted verbs are supplemented from surface expressions (key words) and examples. When creating a rule for analysis, a text is classified on the basis of whether the text includes verbs which supplement the omitted verbs. When an experiment is carried out with targeting novels, an analysis was made on the test samples with the precision having a reproduction ratio of 84% and a relevance ratio of 82%. This shows that the method is valid. If the text includes verbs for supplementing, the precision is very high. As compared with this, if the text does not include verbs to supplement, the precision is not so high. However, when considering the difficulties of the problem in the case that the text does not include verbs to supplement, it is worthwhile if only a little analysis is possible. Also, when the corpus becomes large, the performance of computers increases, and a large-scale corpus becomes available, a method using examples proposed by this paper will become important.

FIG.10

In a natural language, verbs are sometimes omitted. Restoring omitted verbs is indispensable for achieving interactive systems and high quality machine translation systems. Therefore, in this research, the omitted verbs are supplemented from surface expressions (key words) and examples. When creating a rule for analysis, a text is classified on the basis of whether the text includes verbs which supplement the omitted verbs. When an experiment is carried out with targeting novels, an analysis was made on the test samples with the precision having a reproduction ratio of 84% and a relevance ratio of 82%. This shows that the method is valid. If the text includes verbs for supplementing, the precision is very high. As compared with this, if the text does not include verbs to supplement, the precision is not so high. However, when considering the difficulties of the problem in the case that the text does not include verbs to supplement, it is worthwhile if only a little analysis is possible. Also, when the corpus becomes large, the performance of computers increases, and a large-scale corpus becomes available, a method using examples proposed by this paper will become important.

FIG.11

In a natural language, verbs are sometimes omitted. Restoring omitted verbs is indispensable for achieving interactive systems and high quality machine translation systems. Therefore, in this research, the omitted verbs are supplemented from surface expressions (key words) and examples. When creating a rule for analysis, a text is classified on the basis of whether the text includes verbs which supplement the omitted verbs. When an experiment is carried out with targeting novels, an analysis was made on the test samples with the precision having a reproduction ratio of 84% and a relevance ratio of 82%. This shows that the method is valid. If the text includes verbs for supplementing, the precision is very high. As compared with this, if the text does not include verbs to supplement, the precision is not so high. However, when considering the difficulties of the problem in the case that the text does not include verbs to supplement, it is worthwhile if only a little analysis is possible. Also, when the corpus becomes large, the performance of computers increases, and a large-scale corpus becomes available, a method using examples proposed by this paper will become important.

FIG.12

TEXT:

In a natural language, verbs are sometimes omitted. Restoring omitted verbs is indispensable for achieving interactive systems and high quality machine translation systems. Therefore, in this research, the omitted verbs are supplemented from surface expressions (key words) and examples. When creating a rule for analysis, a text is classified on the basis of whether the text includes verbs which supplement the omitted verbs. When an experiment is carried out with targeting novels, an analysis was made on the test samples with the precision having a reproduction ratio of 84% and a relevance ratio of 82%. This shows that the method is valid. If the text includes verbs for supplementing, the precision is very high. As compared with this, if the text does not

SPECIFIED RANGE:

In a natural language, verbs are sometimes omitted. Restoring omitted verbs is indispensable for achieving interactive systems and high quality machine translation systems. Therefore, in this research, the omitted verbs are supplemented from surface expressions (clue words) and examples.

( DETERMINE )    ( CANCEL )

FIG.13

ATTACH IMPORTANCE TO:
A SHORT SENTENCE
A QUANTITY EXPRESSION
A METHOD
A WRITING STYLE
READABILITY

FIG.17

ATTACH IMPORTANCE TO:
A SHORT SENTENCE
A QUANTITY EXPRESSION
A METHOD
A WRITING STYLE
READABILITY

FIG.18

SOLUTION DATA EDIT PROCESSING APPARATUS AND METHOD, AND AUTOMATIC SUMMARIZATION PROCESSING APPARATUS AND METHOD

CROSS-REFERENCE TO RELATED APPLICATION

This application is based upon and claims priority of Japanese patent application number 2002-45925, filed Feb. 22, 2002, the contents of which are incorporated by reference herein.

BACKGROUND OF THE INVENTION

1. Field of the Invention

The present invention relates to solution-data edit processing for editing solution data which is used in processing for automatically summarizing documents, articles and the like by a machine learning method, and to an automatic summarization processing which uses a machine learning method using editable solution data.

2. Description of the Related Art

In recent years, automatic summarization processing of documents, articles, etc. using a computer has become widespread with developments in information technologies. However, desired summary tendencies are considered to have been diversified by diversification of individual preferences and the summarization purposes.

Using the following Reference 1, personal differences of the summary evaluation tendencies will be described. In the Reference 1, when a plurality of evaluators perform summarization by extracting important sentences individually, a reproduction ratio and a relevance ratio are obtained as mutual evaluation measurement for the result and shown in Table 4. As is apparent from Table 4 in the Reference 1, in the case of summarization by extracting 20 sentences from a group of sentences, with respect to the mutual evaluation (a reproduction ratio and a relevance ratio) among the evaluators, coincidence degrees of each of the evaluators A, B, and C are from 50 to 70%, which are not too high. Thus it is estimated that personal differences exist in evaluation of summaries.

[Reference 1: Yamahiko Ito, et al., Extraction of important sentences from lecture sentences, Language Processing Society, the seventh annual convention proceeding (伊藤山彦 他、講演文を対象にした重要文抽出、言語処理学会第7回年次大会発表論文集), 2001, pp. 305–308]

Also, in the following Reference 2, with reference to important sentence extraction processing, it is shown in Table 4 that the cross-verification precision for the processing sets A, B, and C is best. The target of the cross-verification shown in Table 4 in the Reference 2 can be regarded as the same as the processing by the same evaluator. It is unknown whether the sets A, B, and C in Table 4 is created by the same person. However, it is well understood that the processing precision will be favorable at least when the learning data is created at the same time or by the same person.

[Reference 2: Tsutomu Hirao, et al., Extraction of important sentences by Support Vector Machine, Information Society, basic papers (平尾勉 他、によるSupport Vector Machine 出、情報学会基礎論文), 63-16, 2001, pp. 121–127]

From the conventional research result, it is considered that personal differences and use differences exist in evaluation of summaries. In automatic summarization processing using a machine learning method, a summary specialized for an individual user needs to be created rather than performing summarization based on the same evaluation. In order to achieve this, in automatic summarization processing, a mechanism in which a user can freely edit the solution data to be the supervised data data in a machine learning method needs to be established.

SUMMARY OF THE INVENTION

Accordingly, it is an object of the present invention to achieve a solution-data edit processing apparatus and method in which the user can arbitrarily edit a summary to be the solution data used in a machine learning method or evaluation of the summary. Also, it is another object of the present invention to achieve an automatic summarization processing apparatus and method, in which summarization processing corresponding to each user, can be performed by a machine learning method using the solution data edited by the above-described solution-data edit processing.

In the present invention, the summary and the evaluation thereof are arranged such that the user can arbitrarily edit them in order to feed back the information of what summary is highly evaluated by the user with respect to automatic summarization processing using a machine learning method in which previously provided solution data is used as the supervised data. According to the present invention, there is provided a method of solution-data edit processing for editing solution data which is used in automatic summarization processing of a digitized text by a machine learning method, the method including displaying a summary generated from a text on a display unit; accepting evaluation information set by a user on the summary to use as evaluation of the summary; and outputting solution data which uses the text and the summary as a problem and uses the evaluation as a solution.

Also, in the method of solution-data edit processing of the present invention, the method includes: displaying a text on a display unit; accepting portion data specified by a user from the text and using the portion data as a summary; and outputting the solution data which uses the text and the summary as a problem, and in which a predetermined solution is given to the problem. Alternatively, in the method of processing of the present invention, the method includes: displaying a text on a display unit; accepting portion data specified by a user from the text, and using the portion data as a summary; and outputting the solution data which uses the text as a problem and in which a predetermined solution including the summary is given to the problem.

In the above-described method of solution-data edit processing, when using the portion data as a summary, the method further includes: changing a phrase of the portion data in accordance with a user's instruction; and using the changed portion data as the summary.

Furthermore, in the method of solution-data edit processing of the present invention, the method includes: displaying a summary generated from a text on a display unit; accepting evaluation information specified by a user for each evaluation quality on the summary and using the evaluation information as the quality evaluation; and outputting solution data which uses the text and the summary for each evaluation quality as a problem and using the quality evaluation as a solution. Moreover, the solution-data edit processing apparatus of the present invention executes each processing process described above. Also, in the present invention, by feeding back the summary edited by the user and the evaluation thereof to the automatic summarization processing as solution data, learning corresponding to an individual user is performed in the machine learning processing so that the summarization specialized for the user is carried out.

According to another aspect of the present invention, there is provided a method of automatic summarization processing for automatically summarizing a digitized text by a machine learning method using solution data which uses a text and a summary of the text as a problem and uses evaluation of the summary as a solution, the method including: changing the solution data in accordance with a user's instruction, and accessing solution-data storage means which stores the changed solution data; extracting a pair of a feature set of the problem and the solution from the solution data, learning what solution is apt to be produced from what feature from the pair, and storing learning result data in learning-result-data storage means; generating a summary candidate from input text data; extracting a feature set from the text data and the summary candidate, estimating what solution is apt to be produced from the feature set based on the learning result data, obtaining a certainty factor which is an estimated solution, and generating a pair of the summary candidate and the estimated solution; and selecting a pair having a largest certainty factor of the estimated solution out of the pairs of the estimated solution from pairs of the summary candidates and the estimated solutions, and using the pair of the summary candidate as a summary.

Also, in the method of automatic summarization processing of the present invention, the method includes: changing the solution data in accordance with a user's instruction, and accessing solution-data storage means which stores the changed solution data; extracting a pair of a solution or a solution candidate and a feature set of the problem from the solution data, learning, at what solution or solution candidate and a feature set, probability of a positive example or probability of negative example is produced from the extracted pairs, and storing the learning result data in learning-result-data storage means; generating a summary candidate from input text data; extracting a pair of a feature set and solution candidate from the text data and the summary candidate, in the case of a pair of the feature set and a summary candidate, estimating probability of a positive example or probability of negative example and generating a pair of summary candidate and estimated solution; and selecting a pair having a largest certainty factor of a positive example of the estimated solution from pairs of the summary candidates and the estimated solutions, and using the selected pair of the summary candidate as a summary.

In the above-described method of automatic summarization processing, when accessing the solution-data storage means, the solution-data storage means accessed stores the solution data of which solution is evaluation information for each evaluation quality on the summary, when selecting the summary from a pair of the summary candidate and estimated solution, accepting paired information of evaluation for each evaluation quantity, selecting a pair of the summary-candidate and estimated-solution which has the most similar estimated solution to the paired information, and using the pair of summary candidate as a summary.

Also, in the method of automatic summarization processing of the present invention, the method includes: changing the solution data in accordance with a user's instruction, and accessing solution-data storage means which stores the changed solution data; extracting a pair of a feature set of the problem and a solution from the solution data, learning, at what feature, what solution is apt to be produced from the pair, and storing learning result data in learning-result-data storage means; and extracting a feature set from input text data and estimating what solution is apt to be produced from the feature set based on the learning result data. Furthermore, an automatic summarization processing apparatus of the present invention is an apparatus which performs each processing process of the automatic summarization processing method described above.

Each means, function, or element of the processing apparatus according to the present invention can also be achieved by computer executable processing programs. The processing programs can be stored in a suitable recording medium, such as a computer readable removable medium memory, a semiconductor memory, a hard disk, and so on. Also, processing programs are provided by recording in these recording media. Alternatively, the processing programs are provided by sending/receiving using various communication networks through a communication interface.

BRIEF DESCRIPTION OF THE DRAWINGS

FIG. 3 is a diagram illustrating an example of a text to be the target;

FIG. 4A is a diagram illustrating an example of a summary;

FIG. 4B is a diagram illustrating an example of a summary;

FIG. 4C is a diagram illustrating an example of a summary;

FIG. 10 is a diagram illustrating an example of the text to be displayed and an example of the specified range by a user A;

FIG. 11 is a diagram illustrating an example of the text to be displayed and an example of the specified range by a user B;

FIG. 12 is a diagram illustrating an example of the text to be displayed and an example of the specified range by a user C;

FIG. 13 is a diagram illustrating an example of the display of the range specified by a user;

FIG. 17 is a diagram illustrating an example of the quality information setting screen;

FIG. 18 is a diagram illustrating an example of the quality information setting screen;

DESCRIPTION OF THE PREFERRED EMBODIMENTS

Figure 1:
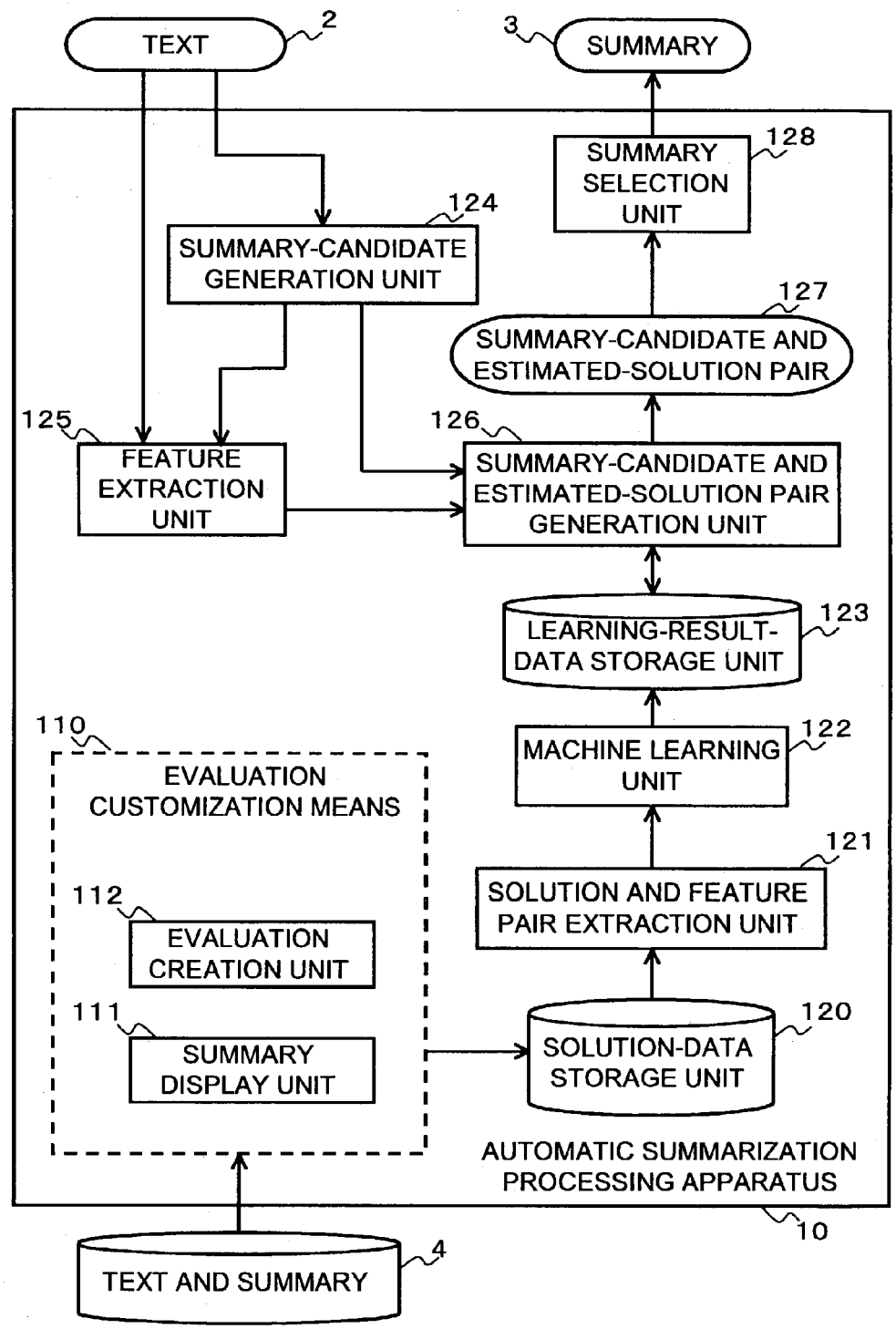
FIG. 1 is a diagram illustrating an example of the configuration of the processing apparatus according to a first embodiment of the present invention.

In the following, a first embodiment will be described. FIG. 1 illustrates an example of the configuration of the processing apparatus according to the first embodiment of the present invention. An automatic summarization processing apparatus 10 includes evaluation customization means 110, a solution-data storage unit 120, a solution and feature pair extraction unit 121, a machine learning unit 122, a learning-result-data storage unit 123, a summary-candidate generation unit 124, a feature extraction unit 125, a summary-candidate and estimated-solution pair generation unit 126, and a summary selection unit 128.

The evaluation customization means 110 is processing means for achieving solution-data edit processing. The solution-data storage unit 120, the solution and feature pair extraction unit 121, the machine learning unit 122, and the learning-result-data storage unit 123 are processing means for achieving machine learning processing executed in the automatic summarization processing. The evaluation customization means 110 is means for customizing a summary and the evaluation thereof for each user, and includes a summary display unit 111 and an evaluation creation unit 112. The summary display unit 111 is a display means for displaying a summary of a text and summary 4 prepared in advance on a display unit (not shown in FIG. 1). The text and summary 4 is data comprising a text and the summary thereof. Here, the text means text data comprising one or a plurality of sentences, paragraph or chapters such as documents, news articles, magazines, or books. The summary is document data summarized from the text. The summary is, for example, created manually, is a summary 3 output by the automatic summarization processing apparatus 10 for an input text 2, or is a summary candidate generated by the summary-candidate generation unit 124 and stored in the solution-data storage unit 120.

The evaluation creation unit 112 is means for creating evaluation entered by the user for the summary displayed using the summary display unit 111, or changing the evaluation provided with the summary in advance to the evaluation entered by the user. The solution-data storage unit 120 is means for storing solution data to be a supervised data when the machine learning unit 122 executes a machine learning method. The solution-data storage unit 120 stores, as solution data, a case, which is a pair of a "problem" composed of a text and the summary thereof, and a "solution" which is the evaluation for the summary. The solution and feature pair extraction unit 121 is means for extracting a pair of a solution and a feature set for each case stored in the solution-data storage unit 120. A feature means one unit of detailed information used for analysis, and here has such meaning as follows: (1) information indicating fluency of a sentence, (2) information indicating whether or not content is well represented, and (3) characteristic information used in the automatic summarization processing.

The machine learning unit 122 is means for learning, by a machine learning method, what solution is apt to be produced with what feature set from the pairs of solution and feature set extracted by the solution and feature pair extraction unit 121 and for saving the learning result in the learning-result-data storage unit 123. The machine learning unit 122 can be achieved by applying a processing method using any method on the condition that the method is any machine learning method using solution data. For a processing method, for example, there are a decision tree method, a support vector method, a parameter tuning method, a simple Bayes method, a maximum entropy method, and a decision list method.

The learning-result-data storage unit 123 is means for storing the learning result data of the machine learning unit 122. The summary-candidate generation unit 124 is means for generating a summary candidate from the input text 2 based on a predetermined method. The summary-candidate generation unit 124 generates a summary candidate using various existing models like, for example, an important sentence selection model, an important place selection model, a model using a transformational rule, a model using a random generation.

The feature extraction unit 125 is means for extracting a feature set concerning a test 2 and a summary candidate generated by the summary-candidate generation unit 124 and for passing the feature set to the summary-candidate and estimated-solution pair generation unit 126.

The summary-candidate and estimated-solution pair generation unit 126 is means for estimating what solution is apt to be produced in the case of the feature set passed from the feature extraction unit 125 with reference to the learning result data in the learning-result-data storage unit 123 and for generating a pair of summary-candidate and estimated-solution (summary-candidate and estimated-solution pair) 127. The summary-candidate and estimated-solution pair generation unit 126 further obtains a certainty factor (probability) and gives it to the summary-candidate and estimated-solution pair 127. The summary selection unit 128 is means for receiving the summary-candidate and estimated-solution pair 127, and for selecting the summary-candidate and estimated-solution pair 127 having the largest certainty factor value and using the summary-candidate as the summary 3.

In order to explain the evaluation customization processing according to the first embodiment, consider the case where three users A, B and C customize each of the summaries. Suppose that the user A evaluates a summary by attaching importance to the point that the summary includes a description on precision. Suppose that the user B evaluates a summary by attaching importance to the point that the summary includes a description on a method, and that the user C evaluates a summary by attaching importance to the point that the summary includes a description on both precision and a method. Also, assume that evaluation of a summary is performed by dividing into three levels, that is, by grouping (evaluating) into one of the following: evaluation 1=good, evaluation 2=intermediate, and evaluation 3=poor.

Figure 2:
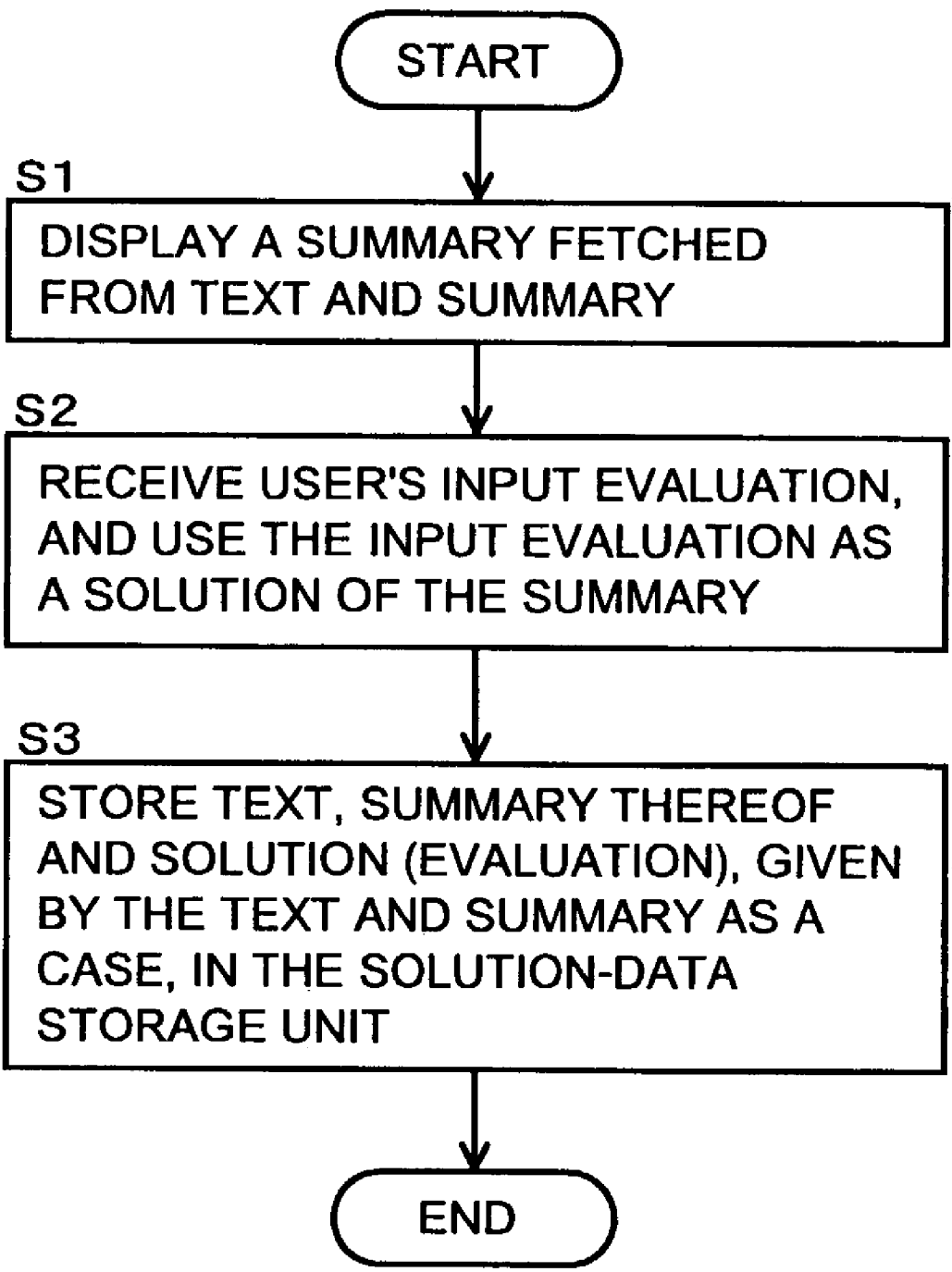
FIG. 2 is a flowchart illustrating the evaluation customization processing according to the first embodiment.

FIG. 2 illustrates a flowchart of the evaluation customization processing according to the first embodiment. First, assume that the text and summary 4 has been prepared. FIG. 3 shows an example of the text and summary 4, and FIGS. 4A, 4B, and 4C show examples of the summaries. FIGS. 4A to 4C show three summaries r1, r2, and r3, respectively.

The summary display unit 111 displays a summary fetched from the text and summary 4 on the display screen (step S1). The evaluation creation unit 112 receives a user's input evaluation and uses the input evaluation as a solution (evaluation) of the displayed summary (step S2). Here, suppose that the user A uses the automatic summarization processing apparatus 10. The user A attaches "evaluation 1" to the summary r1 in FIG. 4A since something related to precision is extracted as the summary. When the evaluation creation unit 112 receives the user input "evaluation 1", the evaluation creation unit 112 sets the evaluation 1 as a solution of the case c1. Next, when the summary display unit 111 displays the summary r2 of the case c2 shown in FIG. 4B, the user A attaches "evaluation 3" to the summary r2, because something related to precision is not extracted in the summary r2. The evaluation creation unit 112 sets the evaluation 3 as the solution of the case c2.

Furthermore, when the summary display unit 111 displays the summary r3 of the case c3 shown in FIG. 4C, the user A attaches "evaluation 2", because although something related to precision is extracted in the summary r3, the summary r3 is somewhat lengthy. The evaluation creation unit 112 sets the evaluation 2 as the solution of the case c3.

In the same manner, assume the case of the user B. The user B attaches "evaluation 3" to the summary r1 shown in FIG. 4A, since something related to a method is not extracted. Also, the user B attaches "evaluation 1" to the summary r2 shown in FIG. 4B, because something related to a method is extracted in the summary r2. Further, the user B attaches "evaluation 2" to the summary r3 shown in FIG. 4C, because although something related to a method is extracted, the summary r3 is somewhat lengthy.

In the same manner, assume the case of the user C. The user C attaches "evaluation 2" to the summary r1 shown in FIG. 4A since something related to precision is extracted, however, something related to a method is not extracted. Also, the user C attaches "evaluation 2" to the summary r2 shown in FIG. 4B, because something related to a method is extracted, however, something related to precision is not extracted. Further, the user C attaches "evaluation 1" to the summary r3 shown in FIG. 4C, because both something related to a method and something related to precision are extracted, although the summary r3 is somewhat lengthy.

The evaluation creation unit 112 sets the input evaluation on the summaries r1 to r3 for the user B and the user C as solutions (evaluation) of the cases c1 to c3, respectively. Then evaluation customization means 110 stores a text, the summary thereof, and the solution, given by the text and summary 4 as a case in the solution-data storage unit 120 (step S3).

Figure 5:
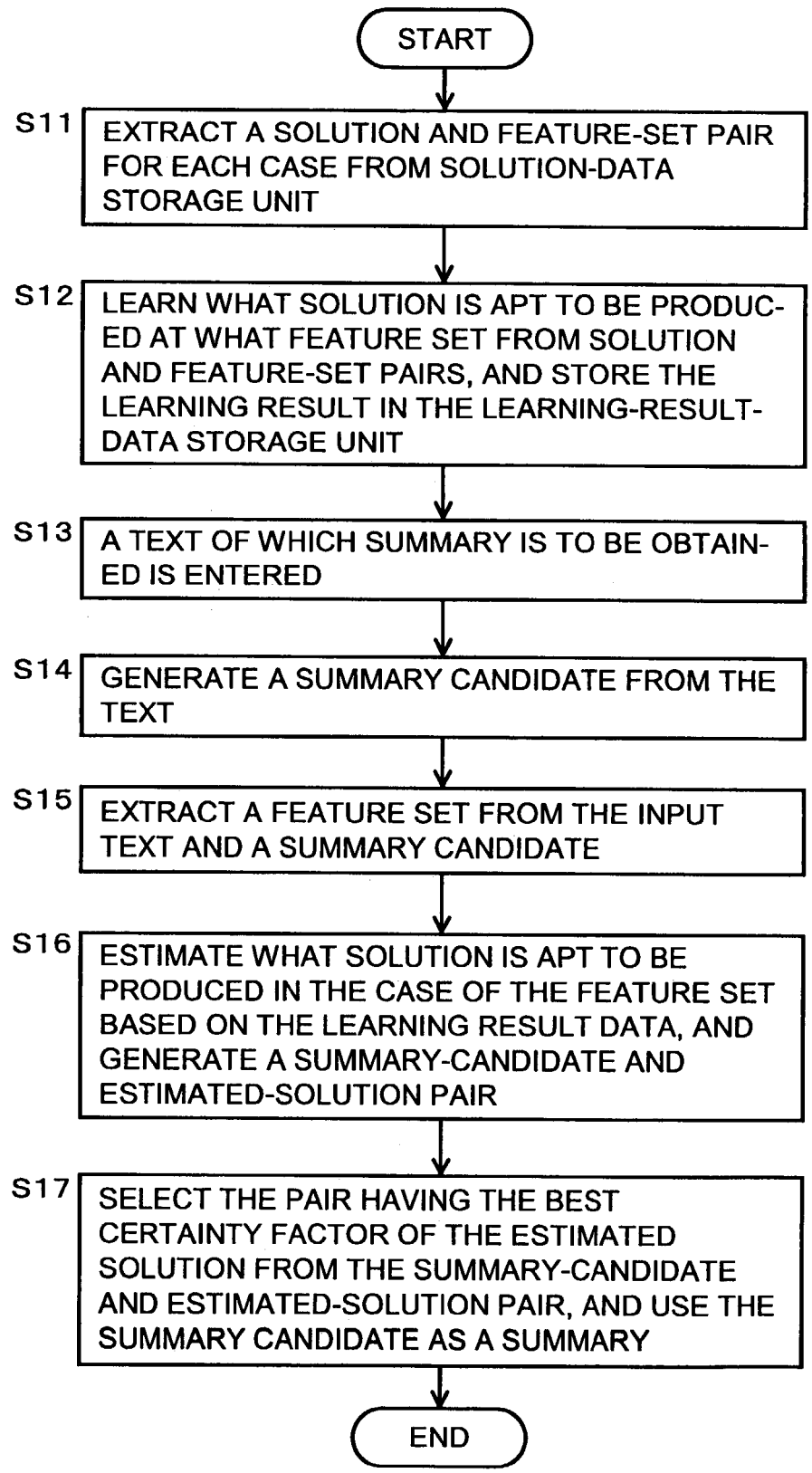
FIG. 5 is a flowchart illustrating the machine learning processing and the automatic summarizing processing in the processing apparatus shown in FIG. 1.

FIG. 5 illustrates a flowchart of the machine learning processing and the automatic summarizing processing. The solution and feature pair extraction unit 121 extracts a pair of a solution and a feature set for each case from the solution-data storage unit 120 (step S11). The solution and feature pair extraction unit 121 extracts, as a feature, for example, (1) as information indicating fluency of a sentence, k-gram morpheme string existence in a corpus, semantic coincidence between clauses having a modification relation, etc., (2) as information indicating whether or not the content is represented, an inclusion ratio of key-phrases contained in the text before summarization, etc., (3) as information used in automatic summarization, the sentence position and whether or not the sentence is a lead sentence, TF/IDF (TF: Term Frequency denotes the number of appearance times or the value indicating frequency of the word in a document, IDF: Inversed Document Frequency denotes the inverse number of the number of documents containing the word among many groups of documents possessed in advance), a length of document, and existence of a key expression such as a peculiar expression, a conjunction and a function word, etc.

Next, the machine learning unit 122 learns what solution is apt to be produced at what feature set from pairs of solution and feature set, and stores the learning result in the learning-result-data storage unit 123 (step S12). Here, in the case of the processing of the user A, the solution data "case: problem→solution" stored in the solution-data storage unit 120 is as follows:

Case c1: text-summary r1→evaluation 1,
Case c2: text-summary r2→evaluation 3,
Case c3: text-summary r3→evaluation 2.

The machine learning unit 122 learns, by machine learning, in what case, evaluation 1 to evaluation 3 are produced based on the solution data. For example, from the case c1→evaluation 1 and the case c3→evaluation 2, the machine learning unit 122 learns that the evaluation increases when an expression of precision, for example, the expression "numeric characters+[%]" appears. Here, the expression "numeric characters+[%]" is an example of a feature used for machine learning processing.

Also, in the case of the processing of the user B, the solution data "case: problem→solution" is as follows:

Case c1: text-summary r1→evaluation 3,
Case c2: text-summary r2→evaluation 1,
Case c3: text-summary r3→evaluation 2.

The machine learning unit 122 learns that the evaluation increases when technical terms corresponding to a method like, for example, "key expression" and "example" appear.

Also, in the case of the processing of the user C, the solution data "case: problem→solution" is as follows:

Case c1: text-summary r1→evaluation 2,
Case c2: text-summary r2→evaluation 2,
Case c3: text-summary r3→evaluation 1.

The machine learning unit 122 learns that the evaluation increases when both expressions corresponding to precision and a method appear. Furthermore, since the shorter the sentence to be output as a summary, the better it is evaluated, in the case of individual processing, learning is performed such that the shorter the sentence, the higher it is evaluated.

For a machine learning method, for example, a simple Bayes method, a decision list method, a maximum entropy method, and a support vector machine method are used. A simple Bayes method is a method in which probability of falling into each classification is estimated based on Bayes' theorem, and the classification having the highest probability value is set as the classification to be obtained. A decision list method is a method in which pairs of features and classification destinations are set as rules and are stored in a list in a predetermined priority order, and when input to be the target of detection is given, the input data and the feature rule is compared from the pair having a high priority, and the classification destination of the rule having the matched feature is set as the classification destination of the input. A maximum entropy method is a method in which, when assuming a preset feature $f_j$ ($1 \leq j \leq k$) set is F, probability distribution is obtained at a time when maximizing the expression indicating entropy while satisfying a predetermined conditional expression, and the classification having the highest probability value is set as the classification to be obtained among each classification probability obtained in accordance with the probability distribution. A support vector machine method is a method for classifying data comprising two classifications by dividing space with hyperplane. For a decision list method and a maximum entropy method, a description is given in the following Reference 3, and for a support vector machine method, descriptions are given in the following References 4 and 5.

[Reference 3: Masaki Murata, Masao Uchiyama, Kiyotaka Uchimoto, Ma Sei, Hitoshi Isahara, Resolving multisense experiment using various machine learning methods, The Institute of Electronics, Information and Communication Engineers, Study group on language understanding and communication (村田真樹、内山将夫、内元清貴、馬青、井佐原均、種々の機械 学習法を用いた多義解消実験、電子情報通信学会言語理解とコミュニケーション 研究会), NCL2001-2, (2001)]

[Reference 4: Nello Cristianini and John Shawe-Taylor, An Introduction to Support Vector Machines and Other Kernel-based Learning Methods, (Cambridge University Press, 2000)]

[Reference 5: Taku Kudoh, Tinysvm: Support Vector machines, (http://cl.aistnara.ac jp/taku-ku//software/TnySVM/index.html,200)]

Thereafter text 2 of which summary is obtained is entered (step S13). The summary-candidate generation unit 124 generates a summary candidate from the text 2 using, for example, the processing model as shown in the following (step S14):

(a) Important Sentence Selection Model

An important sentence selection model is a model for achieving a summary by setting a sentence as a unit and leaving over only the sentences which are considered important from a target text. In the case of this model, it is effective that the sentences selected in all state are set as solution candidates. Also, when a problem arises in computing speed if all solutions are selected as candidates, using a selection rule where criteria have been prepared in advance, only the sentences in a state of satisfying the selection rule may be set as solution candidates. This means that processing load is reduced by decreasing the number of candidates using a predetermined selection rule. In this regard, the selection rule data may be a rule created manually.

(b) Important Part Selection Model

An important place selection model is a model for achieving a summary by setting a smaller part of a sentence as a unit and removing unnecessary parts from a sentence of a target text. This method is the same as the above-described (a) Important sentence selection model except that the unit of a summary is set as a smaller part of a sentence. As a smaller part of a sentence, for example, a word, a phrase, or the like is used. Specifically, a summary is achieved by selecting sentences where unnecessary parts have been removed. In the case of this important part selection model, selecting all the clauses in all states are set as solution candidates. Also, when a problem arises in computing speed if all solutions are selected as candidates, in the same manner as in the above-described (a) Important sentence selection model, a selection rule is prepared in advance, and only the sentences in a state of satisfying the selection rule are set as solution candidates.

(c) Transformational-Rule Use Model

A transformational-rule use model is a model in which a summary is generated using a transformational rule prepared in advance. The Transformational rule is obtained by automatic processing or created manually. For example, the transformational rule which transforms "X is performed, and Y is performed" into "X is performed" and "Y is performed" is created in advance. When the input "A is performed, and B is performed" is given, the summary candidate, "A is performed" and "B is performed", is generated.

(d) Random-Generation Use Model

A random-generation use model is a model such that, for example, if the input " . . . X . . . " is given, " . . . Y . . . " is set as a summary candidate. At this time, X to be replaced may be selected randomly, or may be specified in accordance with a replacement rule data prepared in advance. The replacement-rule data is used by manually created or by obtaining automatically. The replacement destination expression Y may be randomly selected from words of a certain dictionary or a character string set, or may be specified by the transformational-rule data prepared in advance. For the transformational-rule data, as in the same manner as the replacement-rule data, manually created data or automatically obtained data, etc. is used. At this time, if the expression X and the expression Y are not selected randomly, but are selected based on the transformational-rule data, the output is the same as that of the transformational-rule use model.

The feature extraction unit 125 extracts a feature set from the input text 2 and a summary candidate by almost the similar processing as the solution and feature pair extraction unit 121, and passes the feature set to the summary-candidate and estimated-solution pair generation unit 126 (step S15). Then the summary-candidate and estimated-solution pair generation unit 126 estimates what solution is apt to be produced in the case of the received feature set based on the learning result data. Specifically, individual solution (evaluation) and the certainty factors for a plurality of summary candidates are calculated based on the learning result data, and a pair of summary-candidate and estimated-solution (summary-candidate and estimated-solution pair) 127 is generated (step S16). Next, the summary selection unit 128 selects the summary-candidate and estimated-solution pair 127 having the highest certainty factor from the generated summary-candidate and estimated-solution pairs 127, and sets the summary candidate as the summary 3 (step S17).

Figure 6:
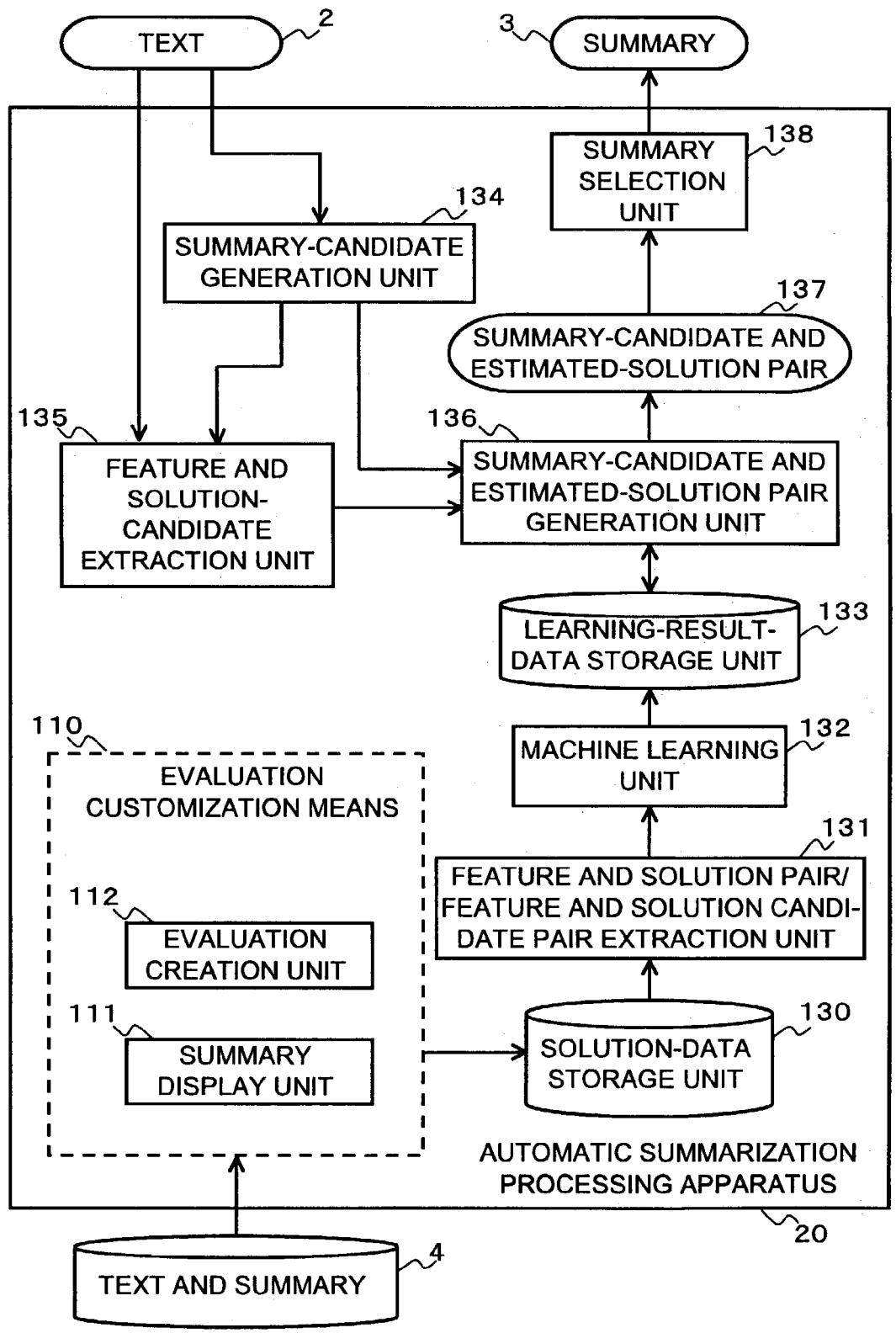
FIG. 6 is a diagram illustrating another example of the configuration of the processing apparatus according to the first embodiment of the present invention.

FIG. 6 illustrates another example of the configuration of the processing apparatus according to the first embodiment of the present invention. In the present embodiment, many candidates can be considered as solutions (classification destinations). However, a case may arise where the number of the types of the classification destinations become too many and processing cannot be performed by a general machine learning method. In such a case, in the automatic summarization processing apparatus 20 shown in FIG. 6, the machine learning unit 132 uses a machine learning method in which only two types of solutions (classification destinations), a positive example and a negative example, are considered in the actual machine learning processing. By this means, it becomes possible to perform processing even when many candidates are considered as solutions (classification destinations), and there are many types of classification destinations.

Furthermore, in the automatic summarization processing apparatus 20 shown in FIG. 6, information that is evaluation, can be used for features of the learning in the machine learning unit 132. The automatic summarization processing apparatus 20 includes evaluation customization means 110, a solution-data storage unit 130, a feature and solution pair/feature and solution-candidate pair extraction unit 131, a machine learning unit 132, a learning-result-data storage unit 133, a summary-candidate generation unit 134, a feature and solution-candidate extraction unit 135, a feature-candidate and estimated-solution pair generation unit 136, and a summary selection unit 138.

The solution-data storage unit 130, the feature and solution pair/feature and solution-candidate pair extraction unit 131, the machine learning unit 132, and the learning-result-data storage unit 133 are processing means for achieving machine learning processing in the automatic summarization processing. Also, the summary-candidate generation unit 134, the feature-solution candidate pair extraction unit 135, and the summary-candidate and estimated-solution pair generation unit 136 are processing means for achieving summary-candidate generation processing. The evaluation customization means 110 and the summary-candidate generation unit 134 perform the same processing as the evaluation customization means 110 and the summary-candidate generation unit 124 in the automatic summarization processing apparatus 10 shown in FIG. 1.

The feature and solution pair/feature and solution-candidate pair extraction unit 131 is means for extracting pair of a solution or solution candidate and feature pair from each case stored in the solution-data storage unit 130. Here, a solution candidate means a solution candidate other than a solution, and evaluation set by a user is set as a solution. Also, a pair of solution and feature set is set as a positive example and a pair of solution candidate and feature set is set as a negative example.

The machine learning unit 132 is means for learning probability of a positive example or probability of a negative example at what solution or solution candidate and feature set from pairs of solutions or solution candidates and feature sets and storing the learning result in the learning-result-data storage unit 133. The feature and solution-candidate extraction unit 135 is means for extracting a pair of solution candidate and feature set from a input text and a summary candidate by the same processing as the feature and solution pair/feature and solution-candidate pair extraction unit 131. The feature-candidate and estimated-solution pair generation unit 136 is means for obtaining probability of a positive example or probability of a negative example in the case of a pair of solution-candidate and feature-set passed from the feature and solution-candidate extraction unit 135, setting the solution having the highest probability of a positive example as an estimated solution, and generating a pair of summary-candidate and estimated-solution (summary-candidate and estimated-solution pair) 137 in that case. The summary selection unit 138 is means for setting a summary candidate of the summary-candidate and estimated-solution pair 137 as the summary 3.

Figure 7:
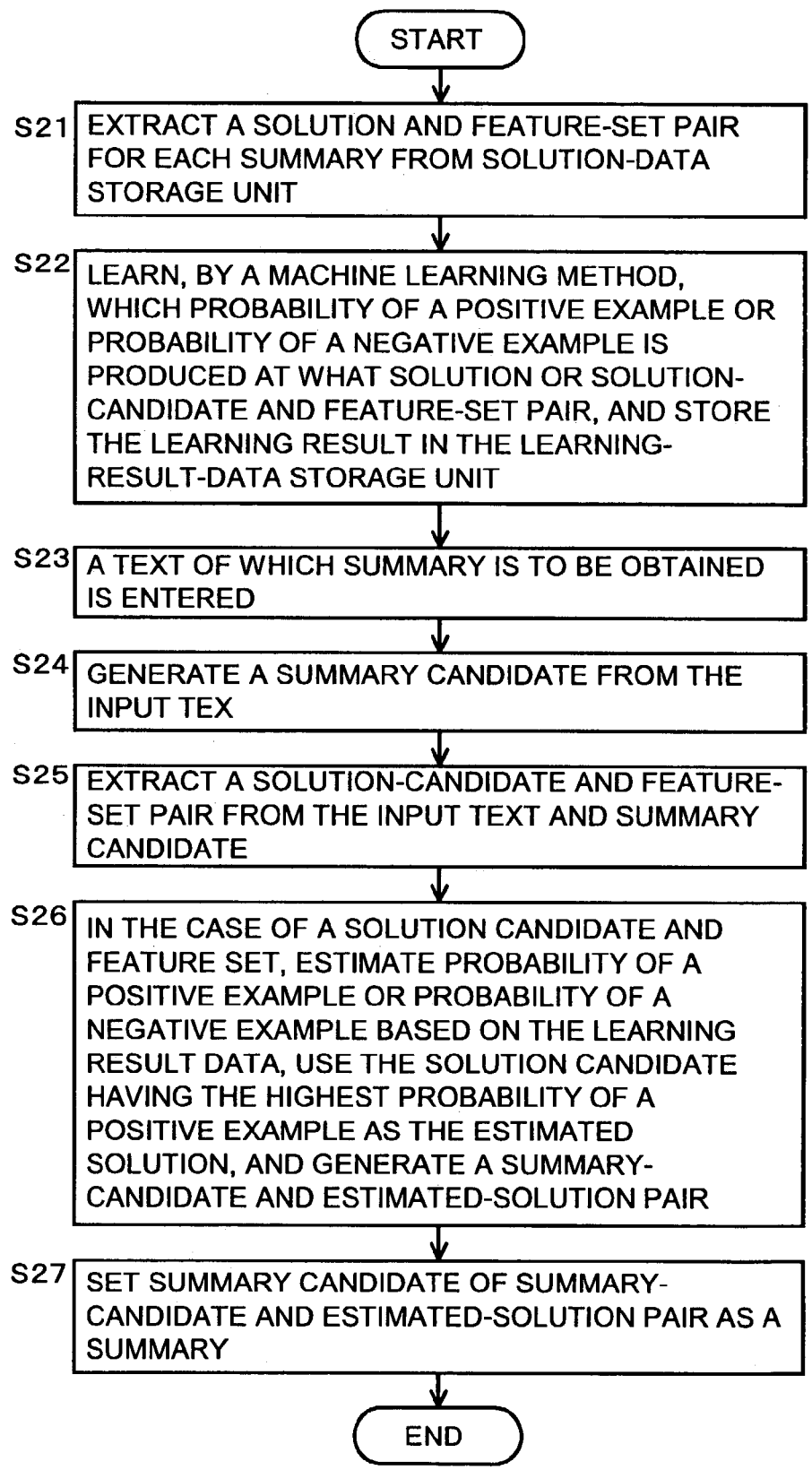
FIG. 7 is a flowchart illustrating the machine learning processing and the automatic summarizing processing in the processing apparatus shown in FIG. 6.

FIG. 7 illustrates a flowchart of the machine learning processing and the automatic summarizing processing in the automatic summarizing processing apparatus 20. The feature and solution pair/feature and solution-candidate pair extraction unit 131 extracts a pair of solution or solution candidate and feature set for each case from the solution-data storage unit 130 (step S21). Then the machine learning unit 132 learns which probability of a positive example or probability of a negative example is produced at what solution or solution candidate and feature set selected from pairs of solutions or solution candidates and feature sets, and stores the learning result in the learning-result-data storage unit 133 (step S22). Thereafter text 2 of which summary is obtained is entered (step S23). The summary-candidate generation unit 134 generates a summary candidate from the text 2 by a predetermined method (step S24). The feature and solution-candidate extraction unit 135 extracts a pair of feature set and solution candidate from the input text 2 and a summary candidate, and passes the pair to the feature-candidate and estimated-solution pair generation unit 136 (step S25).

The feature-candidate and estimated-solution pair generation unit 136 estimates probability of a positive example or probability of a negative example based on the learning result data in the case of a pair of the received solution candidate and feature set, sets the candidate having the highest probability as the estimated solution, and generates the summary-candidate and estimated-solution pair 137 (step S26). The summary selection unit 138 sets a summary candidate of the summary-candidate and estimated-solution pair 137 as the summary 3 (step S27).

In the first embodiment, the user may use the automatic summarization processing apparatus 10 when necessary, and may attach evaluation 1 to 3 to the summary output when using the apparatus. Accordingly, it becomes possible for the user not to feel operational workload and to customize the evaluation of the summary.

Figure 8:
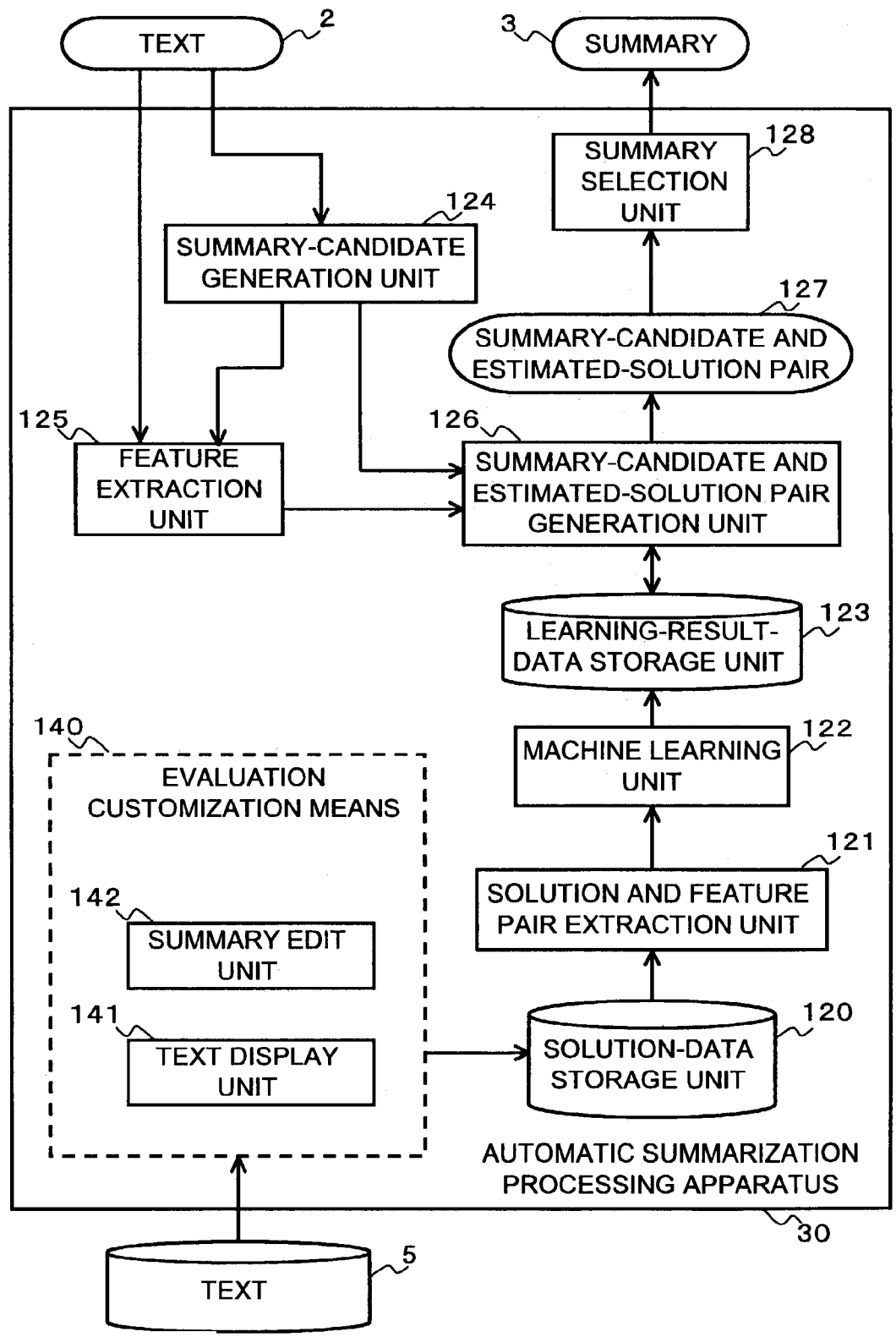
FIG. 8 is a diagram illustrating an example of the configuration of the processing apparatus according to a second embodiment of the present invention.

In the following, a second embodiment will be described. FIG. 8 illustrates an example of the configuration of the processing apparatus according to the second embodiment of the present invention. The automatic summarization processing apparatus 30 shown in FIG. 8 includes each processing means other than the evaluation customization means 110 of the automatic summarization processing apparatus 10 shown in FIG. 1, and also includes the evaluation customization means 140 in place of the evaluation customization means 110.

The evaluation customization means 140 includes a text display unit 141 and a summary edit unit 142. The text display unit 141 is means for displaying a text 5 prepared in advance on the display unit (not shown in FIG. 8). The summary edit unit 142 is means for extracting the portion specified as a summary by the user from the text 5 displayed by the text display unit 141 or editing a summary by changing the expression in the portion specified by the user.

Figure 9:
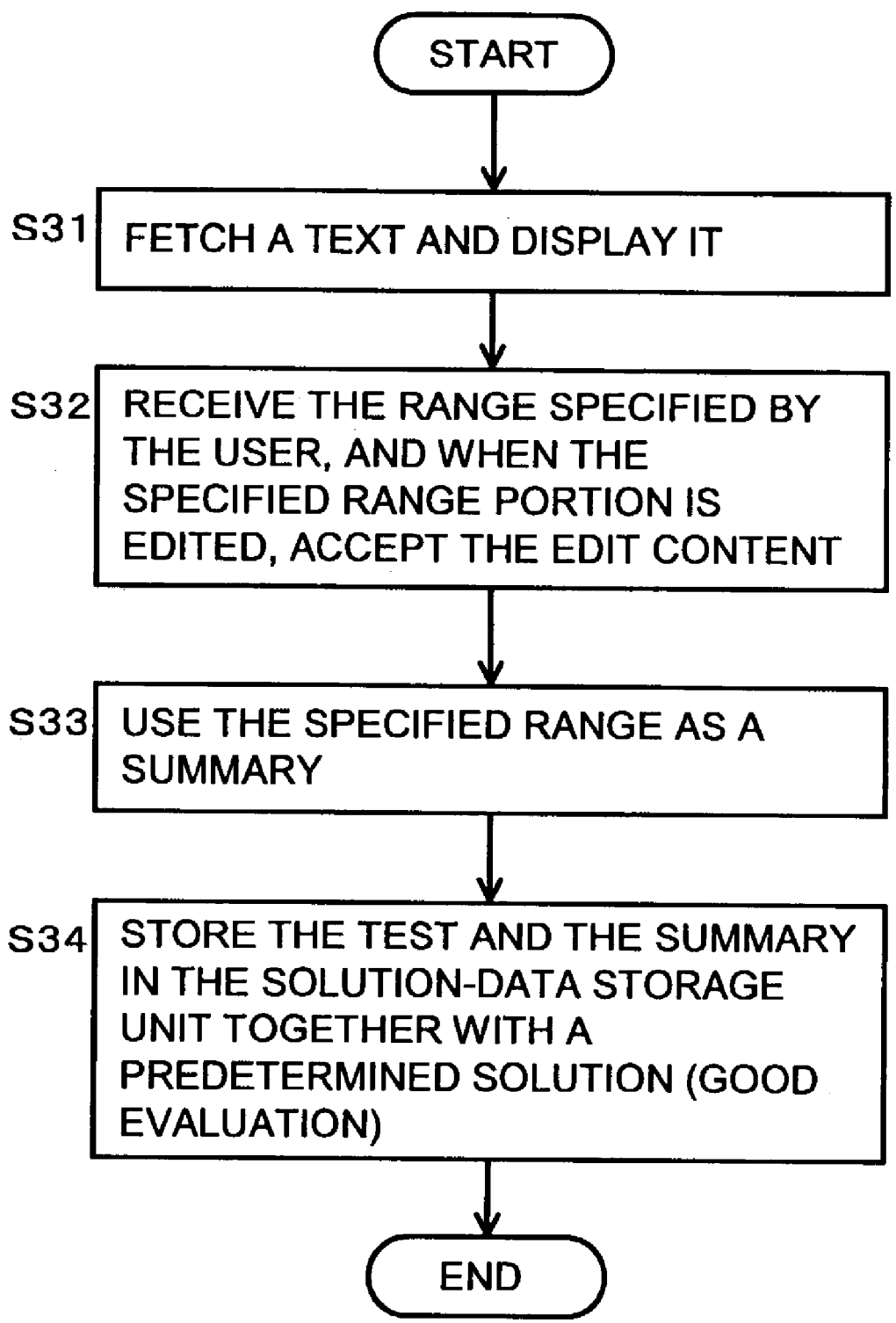
FIG. 9 is a flowchart illustrating the evaluation customization processing according to the second embodiment.

FIG. 9 illustrates a flowchart of the evaluation customization processing according to the second embodiment. The text display unit 141 fetches the text 5 prepared in advance, and displays it on the display unit (step S31). On the displayed text 5, the user specifies the portion suitable for a summary, and the range specified by the user is accepted and extracted (step S32). Also, if the portion of the specified range is edited, the edit content is accepted, and the portion of the specified range after the edit is used as a summary (step S33). The user specifies the range to use as a summary on the displayed text by dragging with a pointing device such as a mouse, or by specification of a start position and an end position indicated trough cursor-key movement. The text display unit 141 displays the specified range by distinguishing the range not specified using inversion or marking on the display.

FIG. 10 illustrates an example of a text to be displayed and an example of the specified range by the user A. The user A specifies the following portion as a portion suitable for a summary:

"When an experiment is carried out with targeting novels, an analysis was made on test samples with the precision having a reproduction ratio of 84% and a relevance ratio of 82%."

The summary edit unit 142 uses the portion specified by the user A (the portion indicated by a broken-line rectangle in the text in FIG. 10) as a summary. Also, the user B specifies the following portion as suitable for a summary:

"In a natural language, verbs are sometimes omitted. Restoring omitted verbs is indispensable for achieving interactive systems and high quality machine translation systems. Therefore, in this research, the omitted verbs are supplemented from surface expressions (key words) and examples."

The summary edit unit 142 uses the portion specified by the user C (the portion indicated by a broken-line rectangle in the text in FIG. 11) as a summary.

Also, the user C specifies the following two portions as suitable for a summary:

"In a natural language, verbs are sometimes omitted. Restoring omitted verbs is indispensable for achieving interactive systems and high quality machine translation systems. Therefore, in this research, the omitted verbs are supplemented from surface expressions (key words) and examples."

"When an experiment is carried out with targeting novels, an analysis was made on test samples with the precision having a reproduction ratio of 84% and a relevance ratio of 82%."

The summary edit unit 142 uses the portion specified by the user C (the portion indicated by a broken-line rectangle in the text in FIG. 12) as a summary.

In this regard, the range specified by the user on the display screen may be displayed separately from the text, and, for expressions in the specified range, the user may edit the content by deleting an arbitrary place or changing expressions. For example, as shown in FIG. 13, the summary edit unit 142 displays the range specified on the text in another field than the text, accepts input from the user for deleting, adding, and changing phrases, etc. in the specified range. When a summary determination button on the display screen shown in FIG. 13 is selected by an operation such as clicking by a mouse, the summary edit unit 142 receives the selection, and extracts the content in the specified range as a summary. Then, when a cancel button on the display screen shown in FIG. 13 is selected, the content in the specified range is cleared.

Next, the summary edit unit 142 stores the text 5 and the extracted summary in the solution-data storage unit 130 together with a predetermined solution (good evaluation) (step S34). The evaluation customization means 140 sets the data which is produced by adding a predetermined solution (poor evaluation) to a summary other than a user-specified summary like, for example, a summary generated by the automatic summarization processing apparatus 20 according to the first embodiment, a summary candidate generated by the summary-candidate generation unit 124 of the automatic summarization processing apparatus 20, or a summary created at random manually as solution data, and stores the data in the solution-data storage unit 130. Subsequently, the flowchart of the machine learning processing and the automatic summarization processing is the same as that of the processing shown in FIG. 5. Here the machine learning unit 122 learns, for each user, about the case composed of the text shown in FIG. 3 and any one of summaries shown in FIGS. 10 to 12 (specifically, the range specified by the user) and the solution.

Figure 14:
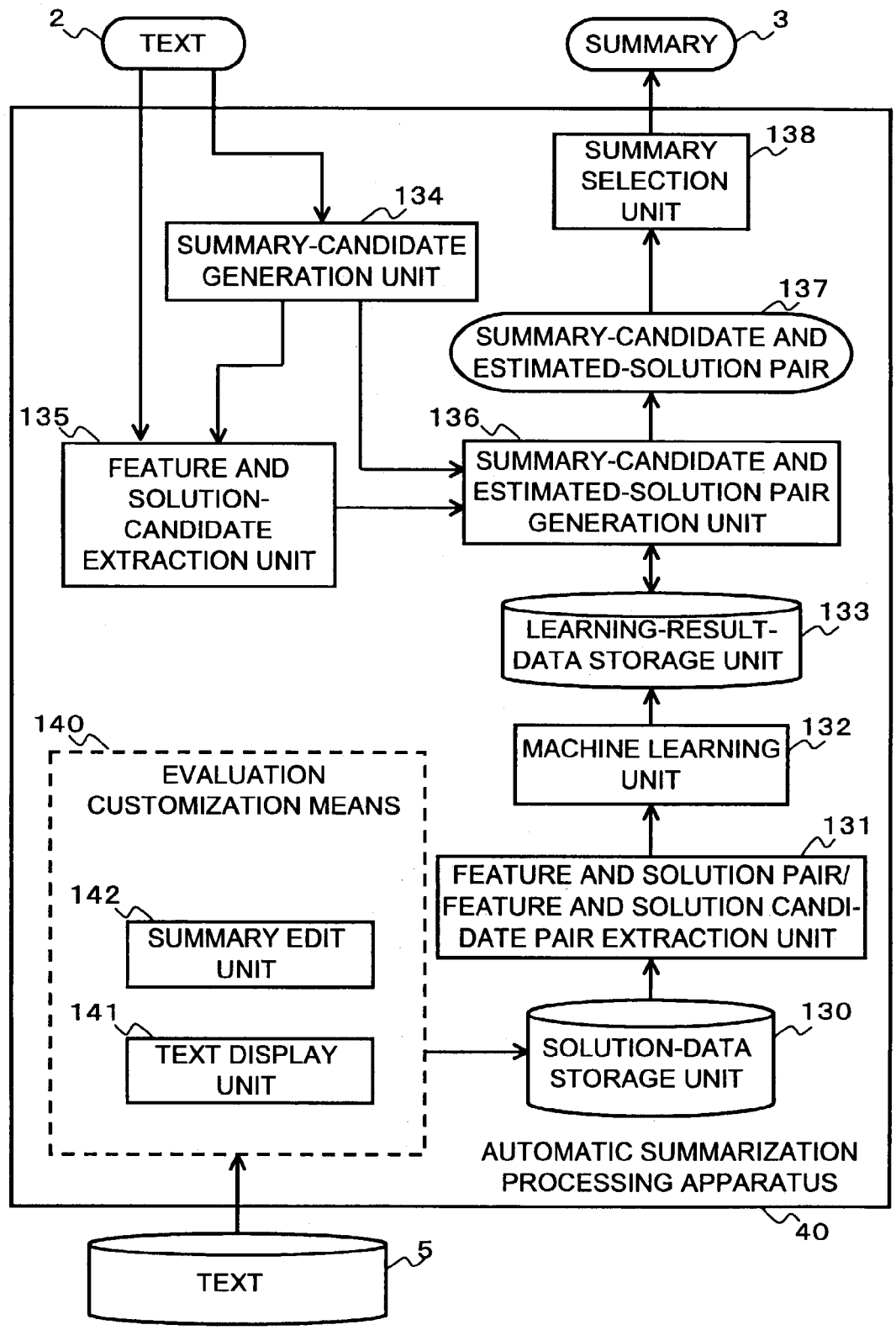
FIG. 14 is a diagram illustrating another example of the configuration of the processing apparatus according to the second embodiment of the present invention.

FIG. 14 illustrates another configuration example of the processing apparatus according to the second embodiment of the present invention. In this embodiment, the case where too many solutions (classification destinations) exist and the processing cannot be performed by a general machine learning method may also arise. Therefore, in the automatic summarization processing apparatus 40 shown in FIG. 14, the machine learning unit 132 enables the processing by using a machine learning method in which only two types of solutions (classification destinations), positive examples and negative examples, are considered.

The automatic summarization processing apparatus 40 includes the same processing means as each processing means other than the evaluation customization means 110 of the automatic summarization processing apparatus 20 shown in FIG. 6, and further includes the evaluation customization means 140 in place of the evaluation customization means 110.

In the present embodiment, since the user specifies the range suitable for a summary on the text, the workload of the user is heavier than that of the case of the first embodiment. However, since the data which is closer to the summary needed for the user can be used as the solution data (supervised data), it is possible to learn to output the summary needed for the user faster.

Figure 15:
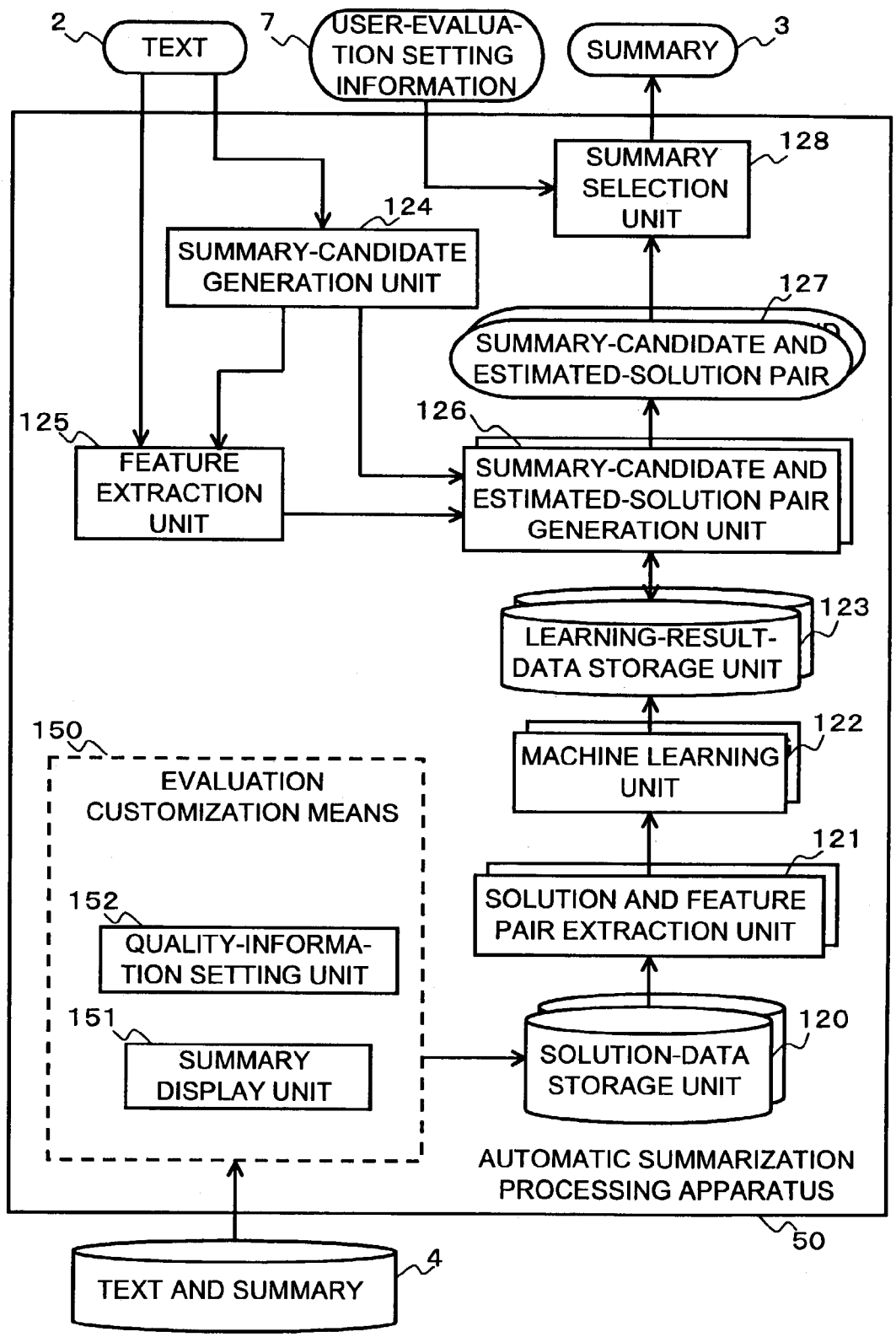
FIG. 15 is a diagram illustrating an example of the configuration of the processing apparatus according to a third embodiment of the present invention.

In the following a third embodiment will be described. FIG. 15 illustrates an example of the configuration of the processing apparatus according to the third embodiment of the present invention. The automatic summarization processing apparatus 50 shown in FIG. 15 includes an evaluation customization means 150 in place of the evaluation customization means 110 of the automatic summarization processing apparatus 10 shown in FIG. 1, and also includes the same processing means as the processing means constituting the automatic summarization processing apparatus 10 as the other processing means.

The evaluation customization means 150 includes a summary display unit 151 and a quality-information setting unit 152. The summary display unit 151 is means for displaying a summary of the text and summary 4 prepared in advance on the display unit (not shown in FIG. 15). The quality-information setting unit 152 is means for generating a plurality of pieces of quality information concerning the evaluation of the summary and setting the evaluation for each quality information.

The quality information is information on various qualities constituting the evaluation of a summary, and is, for example, (1) information whether or not importance is attached to short sentences (attach importance to a short sentence), (2) information whether or not importance is attached to the fact that the expressions on quantities are included in the summary (attach importance to a quantity expression), (3) information whether or not importance is attached to the fact that the expressions on methods are included in the summary (attach importance to a method expression), (4) information whether or not importance is attached to the writing style of the summary (attach importance to a writing style), and (5) information whether or not importance is attached to the readability of the summary (attach importance to readability).

The evaluation customization means 150 is formed to enable the user to set a plurality of pieces of quality information concerning the evaluation as needed for the user such that the machine learning unit 122 can learn each of the plurality of pieces of quality information concerning the evaluation of the summary. Then the user's evaluation on the summary is defined using a plurality of pieces of quality information.

In the present embodiment, the solution-data storage unit 120 is prepared corresponding to the number of pieces of quality information set in the quality-information setting unit 152, and machine learning is performed for each piece of the quality information. Accordingly, each processing means of the solution and feature pair extraction unit 121, the machine learning unit 122, the learning-result-data storage unit 123, the summary-candidate and estimated-solution pair generation unit 126 is provided corresponding to the number of pieces of quality information.

Figure 16:
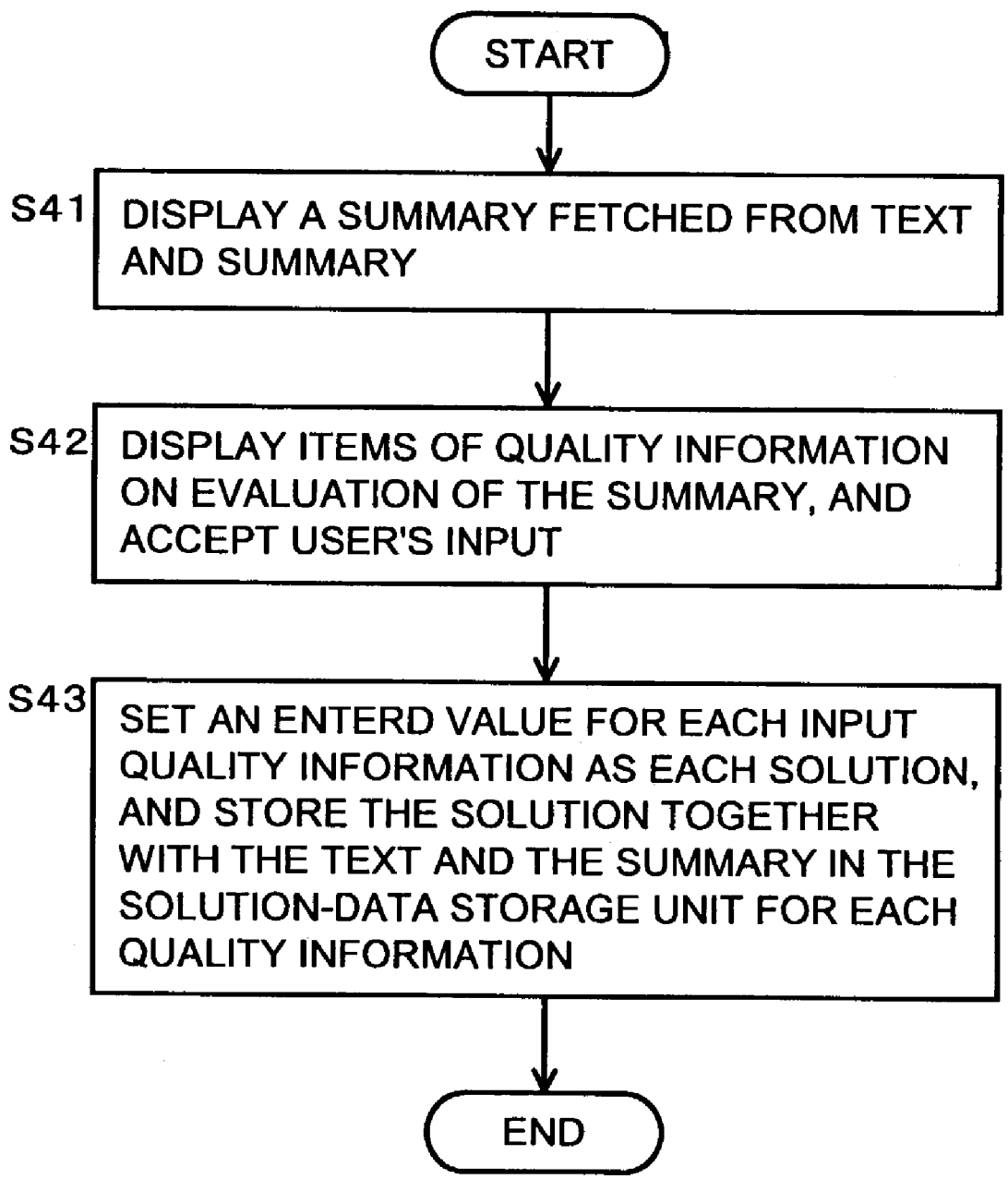
FIG. 16 is a flowchart illustrating the evaluation customization processing according to the third embodiment.

FIG. 16 illustrates a flowchart of the evaluation customization processing. The summary display unit 151 displays a summary fetched from the text and summary 4 (step S41). The quality-information setting unit 152 displays a plurality of quality information items for the displayed summary, prompts the user to enter each item value, new item setting, etc., and accepts the user's input (step S42).

FIGS. 17 and 18 illustrates examples of quality information setting screens. On the quality information setting screen, slide bars are provided corresponding to each of the plurality of pieces of the position information. The user can specify evaluation for each quality information by setting a slide button at any position such as on the right side or on the left side on each quality information slide bar. For example, the user sets what evaluation is given to the displayed summary with respect to each quality information item, for example, "attach importance to a short sentence, attach importance to a quantity expression, attach importance to a method, attach importance to a writing style, and attach importance to readability" by moving the slide button on the slide bar. In FIGS. 17 and 18, evaluation is formed to become higher as the slide button moves from the left end to the right end in the direction of the slide bar. The user can freely define what a slide bar stands for by entering any quality information on the side of the slide bar.

When the summary display unit 151 displayed the summary r1 shown in FIG. 4A, as shown in FIG. 17, the user A positions the slide button of "attach importance to a short sentence" to the right side because the summary r1 is a short sentence, also positions the slide button of "attach importance to a quantity expression" to the right side because there is an expression on the quantity, also positions the slide button of "attach importance to a method" to the left side because there is no description on a method, and positions the slide buttons of "attach importance to a writing style" and "attach importance to readability" to the right side because the writing style and readability are not so poor.

Also, when the summary display unit 151 displayed the summary r2 shown in FIG. 4B, as shown in FIG. 18, the user A moves the slide button of "attach importance to a short sentence" to the left side in order to give low evaluation because the summary r2 is not so short. Since the other quality information is fairly good, the slide buttons of the other quality information are moved to the right side in order to give high evaluation. Then the quality-information setting unit 152 sets the entered value for each quality information as each solution, and stores the solution, the text, and the summary as a case in the solution-data storage unit 120 for each quality information (step S43).

Subsequently, the flowchart of the machine learning processing and the automatic summarizing processing is almost the same as the flowchart of the processing shown in FIG. 5. Here the machine learning unit 122 provided for each quality information uses the cases stored in the solution-data storage unit 120 of the corresponding quality information as solution data.

The machine learning unit 122 performs learning for each quality information. For example, about the quality information "attach importance to a short sentence", the solution to each case is as follows: in the case c1 (summary r1), "solution =the rightmost", and in the case c2 (summary r2), "solution =the left side". The machine learning unit 122 learns in what case evaluation is performed with attaching importance to a short sentence using these solution data as supervised data. Also, the same learning is performed on the other quality information.

In the present embodiment, after machine learning processing, the summary-candidate generation unit 124 generates a summary candidate from the input text 2 by a predetermined method, and the feature extraction unit 125 extracts a feature set from the input text 2 and the summary candidate. Then the summary-candidate and estimated-solution pair generation unit 126 corresponding to each quality information estimates what solution is apt to be produced in the case of the received feature set based on the learning result data, and generates the pair of summary-candidate and estimated-solution (summary-candidate and estimated-solution pair) 127. For example, the summary-candidate and estimated-solution pair generation unit 126 calculates each estimated solution of a plurality of summary candidate and the certainty factor thereof based on the learning result data, and generates the summary-candidate and estimated-solution pair 127 for each quality information.

The summary selection unit 128 accepts user-evaluation setting information 7 in which how much importance is attached to the quality information of evaluation for the summary, compares the evaluation value of each quality information with the user-evaluation setting information 7 by the summary-candidate and estimated-solution pair 127, and selects the most similar summary-candidate and estimated-solution pair, or the most suitable summary-candidate and estimated-solution pair for the user-evaluation setting information 7 to set the summary candidate of the summary-candidate and estimated-solution pair 127 as the summary 3. The summary selection unit 128 may display the quality information setting screen as shown in FIG. 17, and prompt the user to set the user-evaluation setting information 7 which is the summary quality currently necessary by changing the position of slide button on the slide bar on each item of the quality information. For example, when the slide buttons of the "attach importance to a short sentence", "attach importance to a quantity expression", and "attach importance to a method" are moved to the rightmost side, and the slide buttons of "attach importance to a writing style" and "attach importance to readability" are moved to the leftmost side, the user-evaluation setting information 7 means that the user requests the summary 3 adapted to the quality evaluation in which a sentence is preferably short, has a quantity expressions and methods, but disregards a writing style and readability.

Also, as a simple selection method of the summary-candidate and estimated-solution pair 127, the summary selection unit 128 may use, for example, the following expression in order to obtain the combination values of all the solutions Total_Score.

Total_Score =a (attach importance to a short sentence)×
score (attach importance to a short sentence)
a (attach importance to a quantity expression)×score (attach importance to a quantity expression)
a (attach importance to a method)×score (attach importance to a method)
a (attach importance to a writing style)×score (attach importance to a writing style)
a (attach importance to readability)×score (attach importance to readability)

Note that a (X) is a value obtained from the position of the slide button on the slide bar of the quality information X specified by the user. The value becomes larger as the slide button positions in the right side of the slide bar. The value score (X) is the value of the evaluation of the quality information X calculated based on the learning result data. The summary selection unit 128 selects the summary-candidate and estimated-solution pair 127 having the largest combination value Total_Score, and outputs the summary candidate as the summary 3.

In the present embodiment, the processing method in which the summary used in the machine learning unit 122 is displayed and evaluated by the user, and which is similar to the processing in the first embodiment. However, in the present embodiment, as a machine learning method in the second embodiment, the user may specify a range suitable for the summary from a text, further the user evaluates a plurality of qualities concerning the evaluation using a slide bar, etc., and the solution data which is the supervisor signal may be collected. In the case of such processing, it becomes possible to cope with the situation in which even the same user requests a different type of summary for each processing. Also, a plurality of pieces of quality information can be learned at the same time, and thus it becomes possible to reduce the entire processing load when the user gives evaluation (solution).

Figure 19:
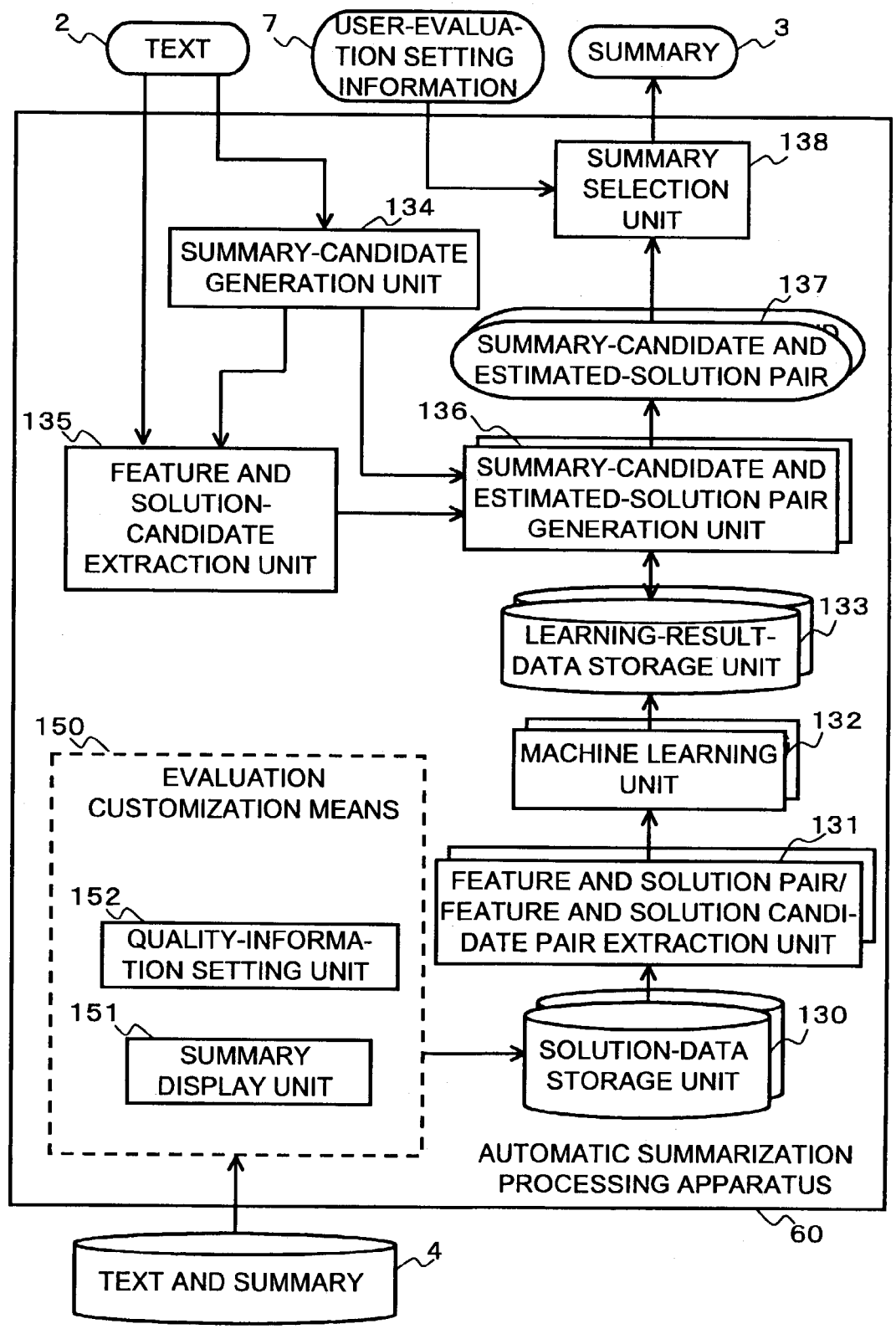
FIG. 19 is a diagram illustrating another example of the configuration of the processing apparatus according to the third embodiment of the present invention.

In the present embodiment, the automatic summarization processing apparatus 60 having the configuration of the processing means as shown in FIG. 19 may be used. The automatic summarization processing apparatus 60 in FIG. 19 includes the same processing means as each processing means other than the evaluation customization means 110 constituting the automatic summarization processing apparatus 20 shown in FIG. 6, and includes the evaluation customization means 150 in place of the evaluation customization means 110. The automatic summarization processing apparatus 60 can avoid too heavy processing load in machine learning by using a machine learning method in which only two types of solutions (classification destinations), a positive example and a negative example, are considered in the actual machine learning processing.

As described above, the present invention has been described by the embodiments thereof, but various variations can be made within the scope of the spirit of the present invention. For example, it is possible to carry out the combination of any embodiments out of the embodiments from the first to the third.

Figure 20:
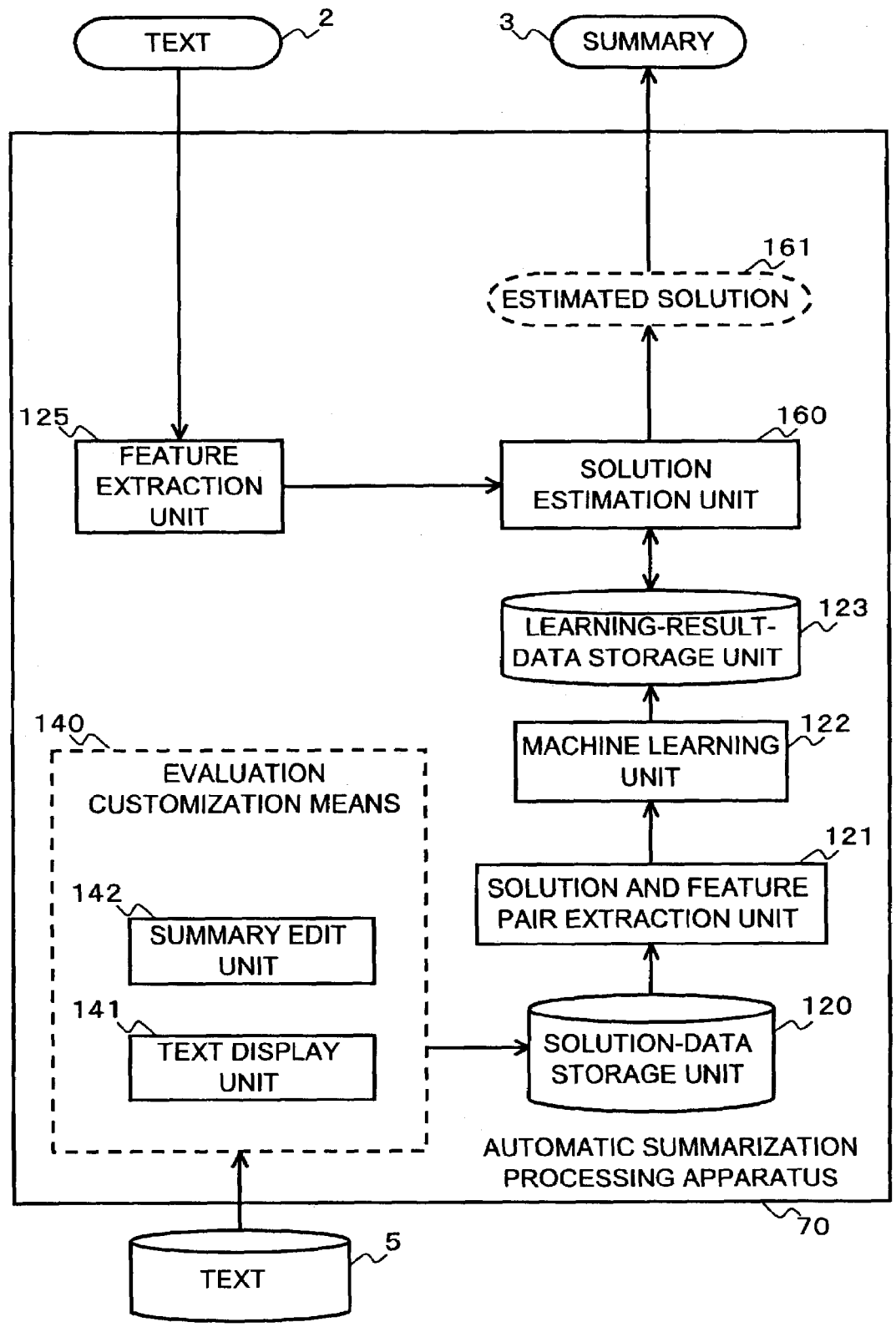
FIG. 20 is a diagram illustrating an example of the configuration of the processing apparatus according to a fourth embodiment of the present invention.

In the following, a fourth embodiment will be described. FIG. 20 illustrates an example of the configuration of the processing apparatus according to a fourth embodiment of the present invention. An automatic summarization processing apparatus 70 shown in FIG. 20 includes a solution-data storage unit 120, a solution and feature pair extraction unit 121, a machine learning unit 122, a learning-result-data storage unit 123, a feature extraction unit 125, a solution estimation unit 160, and evaluation customization means 140. Each unit of the automatic summarization processing apparatus 70, that is, the solution-data storage unit 120, the solution and feature pair extraction unit 121, the machine learning unit 122, the learning-result-data storage unit 123, the feature extraction unit 125, and the evaluation customization means 140 is processing means which performs almost the similar processing as the processing means having the same number shown in FIG. 8.

The solution estimation unit 160 is means for referring to the learning result data of the learning-result-data storage unit 123, estimating what solution is apt to be produced in the case of the feature set passed from the feature extraction unit 125, and setting the estimated solution 161 as the summary 3. In this embodiment, the solution-data storage unit 120 stores the solution data having a text as a problem and the summary of the text as a solution, and the machine learning unit 122 performs machine learning using a solution and feature pair extracted from these solution data. Also, the feature extraction unit 125 extracts the feature of the input text 2, and passes it to the solution estimation unit 160.

Figure 21:
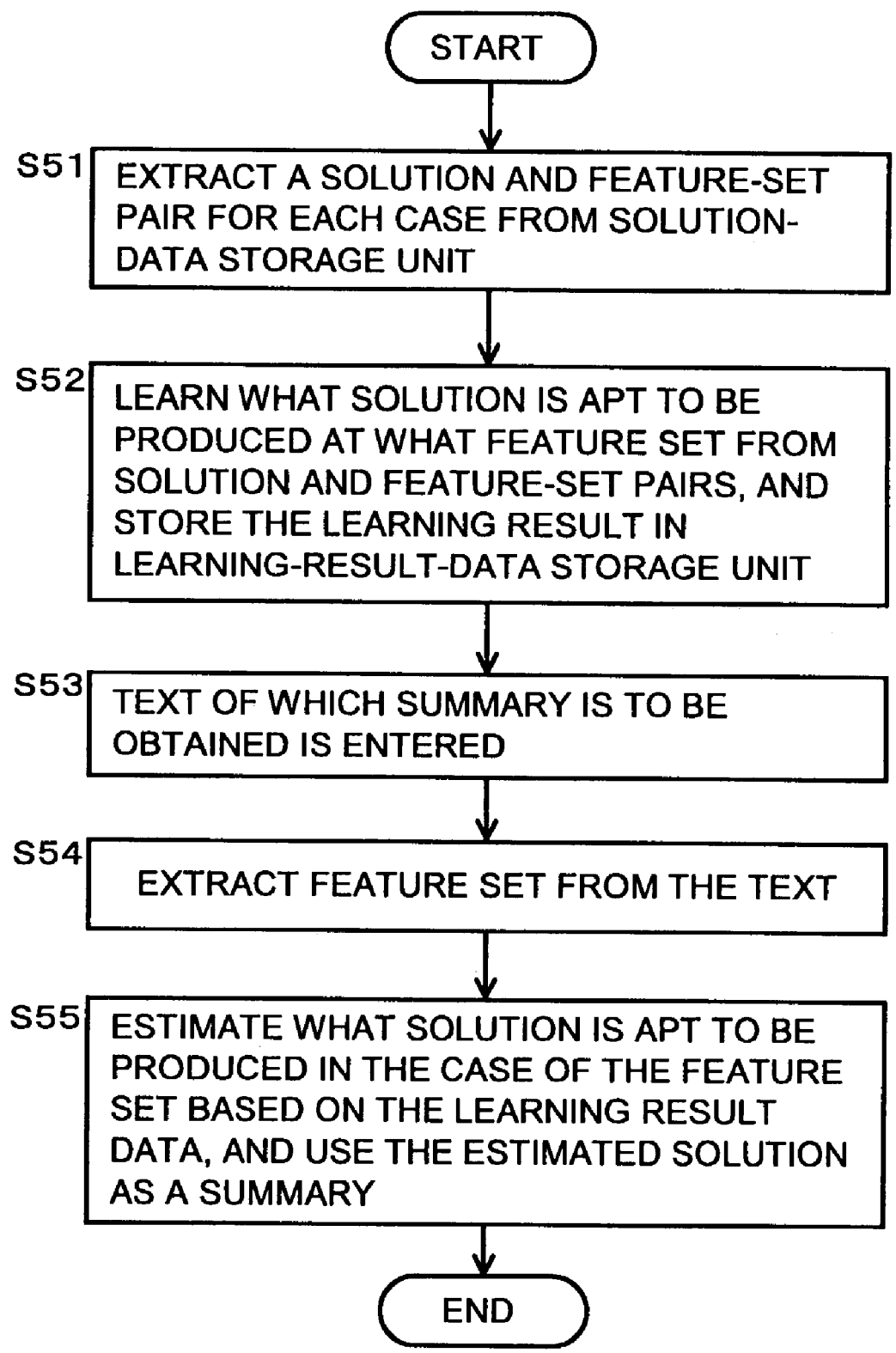
FIG. 21 is a flowchart illustrating the machine learning processing and the automatic summarizing processing in the processing apparatus shown in FIG. 20.

FIG. 21 illustrates the machine learning processing and the automatic summarizing processing according to the fourth embodiment. The solution and feature pair extraction unit 121 extracts a pair of solution and feature set for each case from the solution-data storage unit 120 (step S51). Next, the machine learning unit 122 learns what solution is apt to be produced at what feature set from pairs of solution and feature set, and stores the learning result in the learning-result-data storage unit 123 (step S52). In this regard, the processing in steps S51 and S52 is the same as the processing in steps S11 and S12 shown in FIG. 5. Thereafter text 2 of which the summary is obtained is entered (step S53). The feature extraction unit 125 extracts a feature set from the input text 2 by almost the similar processing as the solution and feature pair extraction unit 121, and passes it to the solution estimation unit 160 (step S54). Then the solution estimation unit 160 estimates what solution is apt to be produced in the case of the received feature set based on the learning result data, and sets the estimated solution 161 as the summary 3 (step S55).

In this embodiment, machine learning is performed using solution data having the summary of a text as the solution, and the estimated solution to be the summary is directly obtained in the solution estimation processing with reference to the learning result.

As described above, by the present invention, the user can arbitrarily set estimation for the summary to be the solution data of the machine learning. By this means, even in the automatic summarization processing using a computer, it becomes possible to perform summarization specialized for the user as opposed to summarization by one classification. Also, evaluation of summaries even by the same person is thought to vary. By the present invention, evaluation of a summary can be set as needed even by the same person. Thus by performing machine learning once again using new solution data, it becomes possible to perform summarization suited to new evaluation aspect.

What is claimed is:

1. A solution-data edit processing apparatus for editing solution data which is used in automatic summarization processing of a digitized text data by a machine learning method, the apparatus comprising:
   means for obtaining text data and summary data of the text data;
   means for displaying either the text data or the summary data or both of them;
   means for, when the summary data is displayed, obtaining evaluation information which includes measure values chosen by a user from two or more predetermined levels in each of the qualities of the summarization and setting a set of said measure values of the evaluation information as a user's evaluation information; and
   means for generating solution data which uses the text data and the summary data as a problem and uses the evaluation information as a solution, and outputting the solution data.

2. The solution-data edit processing apparatus according to claim 1, further comprising means for obtaining partial data specified by a user in the text data when the text data is displayed, and wherein the means for generating sets the partial data, as the summary data, in the solution data.

3. The solution-data edit processing apparatus according to claim 2, wherein the means for generating solution data changes a word or phrase of the partial data according to the user's instructions and sets up the changed partial data as the summary data.

4. The solution-data edit processing apparatus according to claim 1, wherein, when the summary data is displayed, the means for obtaining evaluation data displays an entry screen to make the user chose a measure value from each measure of each of the qualities of evaluation of summarization and obtains collectively the measure values chosen by the user.

5. The solution-data edit processing apparatus according to claim 1, further comprising:
means for updating the qualities of evaluation of summarization with the quality input by the user through the entry screen.

6. The solution-data edit processing apparatus according to claim 1, wherein the qualities of evaluation of summarization includes at least any one of quality regarding the shortness of sentences in the summary data, the ease of reading of the summary data, or the style of the summary data.

7. A solution-data edit processing method for editing solution data which is used in automatic summarization processing of a digitized text data by a machine learning method, the method comprising:
obtaining text data and summary data of the text data;
displaying either the text data or the summary data or both of them;
obtaining evaluation information which includes measure values chosen by a user from two or more predetermined levels in each of the qualities of the summarization and setting a set of measure values of the evaluation information as a user's evaluation information; and
generating solution data which uses the text data and the summary data as a problem and uses the evaluation information as a solution, and outputting the solution data.

8. The solution-data edit processing method according to claim 7, further comprising obtaining portion data specified by a user in the text data when the text data is displayed, and wherein the generating sets the partial data, as the summary data, in the solution data.

9. The solution-data edit processing method according to claim 8, wherein when summarizing the portion data, the method further includes:
generating solution data that changes a word or phrase of the partial data according to the user's instructions; and
setting up the changed partial data as the summary data.

10. The solution-data edit processing method according to claim 7, wherein, obtaining evaluation data displays an entry screen to make the user chose a measure value from each measure of each of the qualities of evaluation of summarization and obtains collectively the measure values chosen by the user.

11. The solution-data edit processing method according to claim 7, further comprising:
updating the qualities of evaluation of summarization with the quality input by the user through the entry screen.

12. The solution-data edit processing method according to claim 7, wherein the qualities of evaluation of summarization includes at least any one of quality regarding the shortness of sentences in the summary data, the ease of reading of the summary data, or the style of the summary data.

13. An automatic summarization processing apparatus for generating
summary data from digitized text data using a supervised machine learning method with solution data which consists of text data and its summary data as a problem and user's evaluation information as its solution, the apparatus comprising:
means for obtaining text data and summary data of the text data;
means for displaying either the text data or the summary data or both of them;
means for, when the summary data is displayed, obtaining evaluation information which includes measure values chosen by a user respectively from two or more predetermined levels in each qualities of the summarization and setting a set of measure values of the obtained evaluation information as a user's evaluation information; and
means for generating solution data which uses the text data and the summary data as a problem and uses the evaluation information as a solution, and storing the solution data in a solution data storage unit;
means for extracting the solution data from the solution data storage unit and obtaining features of the problem in the extracted solution data by semantically and syntactically analyzing said solution data;
means for generating a combination with the features of the problem and the user's evaluation information in the solution data;
means for learning what solution is apt to be produced with what set of features from the combination and storing a result of learning in a learning result-data storage unit;
means for generating summary candidate data from input text data;
means for generating a combination with the input text data and each one of the summary candidate data;
means for obtaining features of each of the combination by semantically and syntactically analyzing said combination;
means for estimating what solution is apt to be produced with features of the combination based on the result of learning, obtaining a certainty factor as a solution and generating a pair of the summary candidate data and its a certainty factor; and
means for selecting the pair having a largest certainty factor and extracting the summary candidate data of the selected pair as the summary data of the inputted text data.

14. The automatic summarization processing apparatus according to claim 13, wherein the solution-data storage means stores solution data of which solution is estimation information for each estimation quality on the summary, the summary selection processing means accepts a paired information of evaluation for each of the quality evaluation, selects a pair of the summary candidate and estimated solution which has the most similar estimated solution to the paired information, and uses the pair of summary candidate as a summary.

15. The solution-data edit processing apparatus according to claim 13, wherein, when the summary data is displayed, the means for obtaining evaluation data displays an entry screen to make the user chose a measure value from each measure of each of the qualities of evaluation of summarization and obtains collectively the measure values chosen by the user.

16. The solution-data edit processing apparatus according to claim 13, further comprising:
means for updating the qualities of evaluation of summarization with the quality input by the user through the entry screen.

17. The solution-data edit processing apparatus according to claim 13, wherein the qualities of evaluation of summarization includes at least any one of quality regarding the shortness of sentences in the summary data, the ease of reading of the summary data, or the style of the summary data.

18. An automatic summarization processing apparatus for generating summary data from digitized text data using a supervised machine learning method with solution data which consists of text data and its summary data as a problem and user's evaluation information as its solution, the apparatus comprising:
means for obtaining text data and summary data of the text data;
means for displaying either the text data or the summary data or both of them;
means for, when the summary data is displayed, obtaining evaluation information which includes measure values chosen by a user from two or more predetermined levels in each of the qualities of the summarization and setting a set of measure values of the obtained evaluation information as a user's evaluation information; and
means for generating solution data which uses the text data and the summary data as a problem and uses the evaluation information as a solution, and storing the solution data in a solution data storage unit;
means for extracting the solution data from the solution data storage unit and obtaining features of the problem in the extracted solution data by semantically and syntactically analyzing said solution data;
means for generating a combination with the features of the problem and one among the solution and solution candidates which are other set of measure value set with all the preset measure values excepting the set of measure values of the user's evaluation information;
means for learning how probabilities of being a positive example or a negative example are produced at what set of features of the combination and storing a result of learning in a learning-result-data storage unit;
means for generating summary candidate data from input text data;
means for generating a combination with the input text data and one each of the summary candidate data;
means for obtaining features of each the combination by semantically and syntactically analyzing each combination;
means for estimating what probabilities of being a positive example or a negative example are produced with features of the combination based on the result of learning, obtaining a probability of being a positive example as a solution and generating a pair of the summary candidate data and its probability; and
means for selecting the pair having a largest probability of being a positive example and extracting the summary candidate data of the selected pair as the summary data of the inputted text data.

19. The automatic summarization processing apparatus according to claim 18, wherein the solution-data storage means stores solution data of which solution is evaluation information for each evaluation quality on the summary, the summary selection processing means accepts paired information for each quality of the evaluation, selects a pair of the summary-candidate and estimated-solution which has the most similar estimated solution to the pair information, and uses the pair of summary candidate as a summary.

20. The solution-data edit processing apparatus according to claim 18, wherein, when the summary data is displayed, the means for obtaining evaluation data displays an entry screen to make the user chose a measure value from each measure of each of the qualities of evaluation of summarization and obtains collectively the measure values chosen by the user.

21. The solution-data edit processing apparatus according to claim 18, further comprising:
means for updating the qualities of evaluation of summarization with the quality input by the user through the entry screen.

22. The solution-data edit processing apparatus according to claim 18, wherein the qualities of evaluation of summarization includes at least any one of quality regarding the shortness of sentences in the summary data, the ease of reading of the summary data, or the style of the summary data.

23. An automatic summarization processing apparatus for automatically summarizing a digitized text by a machine learning method using solution data which uses a text as a problem and uses the summary of the text as a solution, the processing apparatus comprising:
solution-data storage means which changes the solution data in accordance with a user's instruction;
machine learning processing means which extracts a pair of a feature set of the problem and the solution from the solution data, learns what solution is apt to be produced from what feature from the pair, and stores learning result data in learning-result-data storage means;
summary-candidate generation processing means which generates a summary candidate from input text data;
generation means of a pair of a summary candidate and an estimated solution, which extracts a pair of a feature set and solution candidate from the text data and the summary candidate, estimates probability of a positive example or probability of a negative example is-produced at what pair of the solution or solution candidate and a feature set based on the learning result data, and generates a pair of the summary candidate and estimated solution; and
solution estimation processing means which extracts a feature set from input text data, and estimates what solution is apt to be produced from the feature set based on the learning result data.

24. An automatic summarization processing method for generating summary data from digitized text data using a supervised machine learning method with solution data which consists of text data and its summary data as a problem and user's evaluation information as its solution, the method comprising:
obtaining text data and summary data of the text data;
displaying either the text data or the summary data or both of them;
obtaining evaluation information which includes measure values chosen by a user from two or more predetermined levels in each of the qualities of the summarization and setting a set of measure values of the obtained evaluation information as a user's evaluation information; and generating solution data which uses the text data and the summary data as a problem and uses the evaluation information as a solution, and storing the solution data in a solution data storage unit;

extracting the solution data from the solution data storage unit and obtaining features of the problem in the extracted solution data by semantically and syntactically analyzing said solution data;

generating a combination with the features of the problem and the user's evaluation information in the solution data;

learning what solution is apt to be produced with what set of features from the combination and storing a result of learning in a learning result-data storage unit;

generating summary candidate data from input text data;

generating a combination with the input text data and one each of the summary candidate data;

obtaining features of each the combination by semantically and syntactically analyzing said combination;

estimating what solution is apt to be produced with features of the combination based on the result of learning, obtaining a certainty factor as a solution and generating a pair of the summary candidate data and its a certainty factor; and selecting the pair having a largest certainty factor and extracting the summary candidate data of the selected pair as the summary data of the inputted text data.

25. The automatic summarization processing method according to claim 24, wherein when extracting the solution-data, the solution-data to be extracted includes solution data of which solution is evaluation information for each evaluation quality on the summary, when selecting the summary from a pair of the summary-candidate and estimated-solution, selecting a pair of the summary-candidate and estimated-solution which has the most similar estimated solution to the pair information, and using the pair of summary candidate as a summary.

26. The solution-data edit processing method according to claim 24, wherein, obtaining evaluation data displays an entry screen to make the user chose a measure value from each measure of each of the qualities of evaluation of summarization and obtains collectively the measure values chosen by the user.

27. The solution-data edit processing method according to claim 24, further comprising:
updating the qualities of evaluation of summarization with the quality input by the user through the entry screen.

28. The solution-data edit processing method according to claim 24, wherein the qualities of evaluation of summarization includes at least any one of quality regarding the shortness of sentences in the summary data, the ease of reading of the summary data, or the style of the summary data.

29. An automatic summarization processing method for generating summary data from digitized text data using a supervised machine learning method with solution data which consists of text data and its summary data as a problem and user's evaluation information as its solution, the method comprising:
obtaining text data and summary data of the text data;
displaying either the text data or the summary data or both of them;
obtaining evaluation information which includes measure values chosen by a user from two or more predetermined levels in each qualities of the summarization and setting a set of measure values of the obtained evaluation information as a user's evaluation information; and generating solution data which uses the text data and the summary data as a problem and uses the evaluation information as a solution, and storing the solution data in a solution data storage unit;

extracting the solution data from the solution data storage unit and obtaining features of the problem in the extracted solution data by semantically and syntactically analyzing said solution data;

generating a combination with the features of the problem and one among the solution and solution candidates which are other set of measure value set with all the preset measure values excepting the set of measure values of the user's evaluation information;

learning how probabilities of being a positive example or a negative example are produced at what set of features of the combination and storing a result of learning in a learning-result-data storage unit;

generating summary candidate data from input text data;

generating a combination with the input text data and one each of the summary candidate data;

obtaining features of each the combination by semantically and syntactically analyzing said combination;

estimating what probabilities of being a positive example or a negative example are produced with features of the combination based on the result of learning, obtaining a probability of being a positive example as a solution and generating a pair of the summary candidate data and its probability; and selecting the pair having a largest probability of being a positive example and extracting the summary candidate data of the selected pair as the summary data of the inputted text data.

30. The automatic summarization processing method according to claim 29, wherein when extracting the solution-data, the solution-data extracted includes the solution data of which solution is evaluation information for each evaluation quality on the summary, when selecting the summary from a pair of the summary-candidate and estimated-solution, accepting paired information of evaluation for each evaluation quantity, selecting a pair of the summary-candidate and estimated-solution which has the most similar estimated solution to the paired information, and using the pair of summary candidate as a summary.

31. The solution-data edit processing method according to claim 29, wherein, obtaining evaluation data displays an entry screen to make the user chose a measure value from each measure of each of the qualities of evaluation of summarization and obtains collectively the measure values chosen by the user.

32. The solution-data edit processing method according to claim 29, further comprising:
updating the qualities of evaluation of summarization with the quality input by the user through the entry screen.

33. The solution-data edit processing method according to claim 29, wherein the qualities of evaluation of summarization includes at least any one of quality regarding the shortness of sentences in the summary data, the ease of reading of the summary data, or the style of the summary data.

34. An automatic summarization processing method for automatically summarizing a digitized text by a machine learning method using solution data which uses a text as a problem and uses the summary of the text as a solution, the method comprising:

changing the solution data in accordance with a user's instruction, and accessing solution-data storage means which stores the changed solution data;

extracting a pair of a feature set of the problem and a solution from the solution data, learning, at what feature, what solution is apt to be produced from the pair, and storing learning result data in learning-result-data storage means; and extracting a feature set from input text data and estimating what solution is apt to be produced from the feature set based on the learning result data.

* * * * *

UNITED STATES PATENT AND TRADEMARK OFFICE
CERTIFICATE OF CORRECTION

| | | |
|---|---|---|
| PATENT NO. | : 7,120,613 B2 | Page 1 of 1 |
| APPLICATION NO. | : 10/369588 | |
| DATED | : October 10, 2006 | |
| INVENTOR(S) | : Masaki Murata | |

It is certified that error appears in the above-identified patent and that said Letters Patent is hereby corrected as shown below:

Title Page, Column 2 (Assistant Examiner), Line 1, after "Fernández" insert --Rivas--.

Column 20, Line 35, change "learning result-data" to --learning-result-data--.

Column 22, Line 44, after "negative example" delete "is-".

Column 23, Line 14, change "learning result-data" to --learning-result-data--.

Signed and Sealed this

Seventeenth Day of April, 2007

JON W. DUDAS
*Director of the United States Patent and Trademark Office*